United States Patent
Shin et al.

(10) Patent No.: US 9,001,847 B2
(45) Date of Patent: Apr. 7, 2015

(54) APPARATUS AND METHOD FOR MAPPING A CLIENT SIGNAL

(75) Inventors: Jong Yoon Shin, Daejeon (KR); Jong Ho Kim, Daejeon (KR); Ji Wook Youn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 122 days.

(21) Appl. No.: 13/305,882

(22) Filed: Nov. 29, 2011

(65) Prior Publication Data

US 2012/0134674 A1    May 31, 2012

(30) Foreign Application Priority Data

Nov. 30, 2010  (KR) .................. 10-2010-0120542
Mar. 22, 2011  (KR) .................. 10-2011-0025333

(51) Int. Cl.
*H04J 3/06* (2006.01)
*H04J 3/16* (2006.01)

(52) U.S. Cl.
CPC ............... *H04J 3/167* (2013.01); *H04J 3/0623* (2013.01); *H04J 2203/0089* (2013.01)

(58) Field of Classification Search
CPC ....... H04J 3/062; H04J 3/0623; H04J 3/1652; H04J 3/167; H04J 2203/0089
USPC .......................... 370/474, 475, 476, 503–515
See application file for complete search history.

(56) References Cited

U.S. PATENT DOCUMENTS

| | | | |
|---|---|---|---|
| 7,564,875 B2 | 7/2009 | Linkewitsch et al. | |
| 2007/0116055 A1* | 5/2007 | Atsumi et al. | 370/476 |
| 2009/0010280 A1* | 1/2009 | Surek | 370/474 |
| 2009/0263135 A1 | 10/2009 | Dong et al. | |

* cited by examiner

*Primary Examiner* — Pao Sinkantarakorn
(74) *Attorney, Agent, or Firm* — William Park & Associates Patent Ltd.

(57) ABSTRACT

Disclosed are an apparatus and a method for mapping an SDH signal and other 40-Gbps client signals through a single data path. The mapping apparatus supports both a justification byte mapping scheme and a sigma-delta distribution mapping scheme and implements a single data path. Accordingly, power consumption may be reduced by changing each mapping mode in a hitless manner or minimizing logic capacity according to a mapping mode used in the mapping apparatus.

20 Claims, 16 Drawing Sheets

(B)

(A)

(A)

(B)

APPARATUS AND METHOD FOR MAPPING A CLIENT SIGNAL

CROSS-REFERENCE TO RELATED APPLICATIONS

This application claims priority to and the benefit of Korean Patent Application No. 10-2010-0120542 and 10-2011-0025333 filed in the Korean Intellectual Property Office on Nov. 30, 2010, and Mar. 22, 2011, the entire contents of which are incorporated herein by reference.

TECHNICAL FIELD

The present invention relates to an apparatus and a method for mapping a client signal. In particular, the present invention relates to an apparatus and a method for mapping a client signal in an Optical Transport Network (OTN) system.

BACKGROUND ART

ITU-T G.709 defines one high-rate frame, i.e., an Optical channel Transport Unit-k (OTUk) (k=1, 2, 3, 4), so as to map a variety of client signals to one high-rate frame through a Time Division Multiplexing (TDM) scheme and transmit the mapped signals over an Optical Transport Network (OTN). One OTUk includes an Optical channel Data Unit (ODUk) and parity bytes for error correction of the ODUk. The ODUk includes a data overhead for information data containing a payload overhead and a payload, that is, an Optical channel Payload Unit (OPUk). k of OPUk/ODUk is defined as 0, 1, 2, 2e, 3, 4, ... k=0 denotes a data rate of 1.25 Gbit/s, k=1 denotes a data rate of 2.5 Gbit/s, k=2/2e denotes a data rate of 10 Gbit/s, k=3 denotes a data rate of 40 Gbit/s, and k=4 denotes a data rate of 100 Gbit/s. OTU1 has a bit rate of approximately 2.666 Gbit/s, OTU2 has a bit rate of approximately 10.709 Gbits, OTU3 has a bit rate of approximately 43.018 Gbit/s, and OTU4 has a bit rate of approximately 111.8 Gbit/s. ITU-T defines only STM-16, STM-64 and STM-256 signals, which are SDH signals, as 2.5-Gbps, 10-Gbps and 40-Gbps client signals at a point of time when an OTU1, OTU2 or OTU3 signal is initially defined. In addition, ITU-T defines a mapping structure for mapping the SDH signals.

FIG. 1 illustrates an OTU3 frame structure and a frame structure for mapping an STM-256 signal to an OPU3 signal area.

An OTUk frame 100 includes a total of four rows each having 4,080 bytes. A front section of the OTUk frame 100 is an overhead area 110, and a rear section of the OTUk frame 100 is a forward error correction (FEC) parity byte area 130. Actual data is mapped to an OPUk payload area 120 and then transmitted. Due to a difference of a basic transmission rate, a fixed stuff byte area 121 having a total of 128 bytes exists in an OPU3 payload area on which the STM-256 signal is loaded, as illustrated in FIG. 1. No data is loaded on the fixed stuff byte area 121, and all fields of the fixed stuff byte area 121 are filled with 0. In FIG. 1, an OPUk OH area 111 and the OPUk payload area 120 correspond to OPUk. Although not illustrated in FIG. 1, when STM-16, which is a 10-Gbps SDH signal, is mapped to OTU2, the fixed stuff byte area having a total of 64 bytes is defined.

When STM64 and OTU3 are mapped in an asynchronous state, a Negative Justification (NJ) byte and a Positive Justification (PJ) byte are used. To be specific, if the incoming STM-64 signal speed is higher than the outgoing OPU-3 signal speed, that is, if signals to be transmitted are increased, actual data are additionally loaded on the NJ byte and then transmitted. On the contrary, if the incoming STM-64 signal speed is lower than the outgoing OPU3 signal speed, actual data are not loaded on the PJ byte. In this manner, if data are loaded and transmitted by appropriately using the NJ byte and the PJ byte, data may be transmitted by absorbing a transmission rate difference corresponding to several tens of ppm between the incoming STM-64 signal and the outgoing OPU3 signal. If a transmitter transmits the data using the NJ byte and the PJ byte, a receiver is required to know whether actual data is carried on the NJ byte and the PJ byte. Therefore, upon data transmission, the relevant information is loaded on a Justification Control (JC) byte and then transmitted. When STM-64 is mapped to OPU3, a lower 2-bit value of the JC byte is used. That is, if the lower 2-bit value of the JC byte is 00, NJ is a stuff byte and PJ is a data byte. If the lower 2-bit value of the JC byte is 01, NJ is a data byte and PJ is a data byte. If the lower 2-bit value of the JC byte is 11, NJ is a stuff byte and PJ is a stuff byte. A case of when the lower 2-bit value of the JC byte is 10 does not occur. At this time, the stuff byte is filled with 0.

However, as network client signals have been further diversified and OTNs have evolved to accommodate the network client signals, a typical Generic Mapping Procedure (GMP) has been required. In recent years, ITU-T G.709 defined as follows: client signals except for these SDH signals should be mapped through the GMP.

FIG. 2 illustrates a frame structure for mapping a 40-Gbps client signal, except for an STM-256 signal, to an OPU3 signal area.

An OTUk frame 200 is similar to the OTUk frame 100. However, the OTUk frame 200 has a frame structure designed such that an OPUk payload area 210 is divided on an M-byte basis and a client signal is mapped on an M-byte basis. The value of M is 1, 2, 8, 32 and 80 when k=0, 1, 2, 3 and 4, respectively. That is, when a 40-Gbps client signal is mapped to a 40-Gbps OPU3 payload area, the 40-Gbps client signal is divided and mapped on a 32-byte basis. One OPU3 frame has a total of 476 M-bytes.

The number of M-bytes in which the client signal is mapped to the OPU3 payload is referred to as Cm, and information is transmitted through a JC1 byte and a JC2 byte, as illustrated in FIG. 2. Due to the M-byte based mapping, there occurs a difference between Cm and Cn, which is the number of bits to be actually mapped in a client signal. Therefore, ΣCnD information is provided as an option that can further improve timing performance by correcting the difference between Cm and Cn.

As such, when the GMP mapping of the OPU3 signal is performed, the OPU3 signal is mapped on a 32-byte basis. Therefore, a stuff also occurs on a 32-byte basis. On the contrary, when the STM-256 signal is mapped to OPU3, a 16-byte fixed stuff is used, instead of a 32-byte basis. In some cases, the NJ byte should be used as data on a 1-byte basis, or the PJ byte should be used as a 1-byte stuff. That is, in order to accommodate all client signals, a data path for mapping only the STM-256 signal and data paths for mapping other 40-Gbps client signals should be separately provided.

Likewise, when the STM-64 signal, which is the 10-Gbps SDH signal, is mapped to the OPU2 signal, a 16-byte fixed stuff is used. The NJ byte should be used as data on a 1-byte unit, or the PJ byte should be used as a 1-byte stuff. On the contrary, other client signals except for the STM-64 signal are mapped on an M-byte basis (M=8). Therefore, a data path for an M-byte based mapping should be provided separately from an existing data path for mapping the STM-64 signal. Hence, the conventional frame structure may be unsuitable for implementing high-integration and high capacity because logic capacity, the use of which is unpredictable, should always be prepared, even unnecessarily.

Therefore, there is a need for an apparatus and a method for efficiently mapping a signal, without regard to a client signal.

SUMMARY OF THE INVENTION

The present invention has been made in an effort to provide an apparatus and a method for mapping client signals having the same data path, without regard to the client signals.

An exemplary embodiment of the present invention provides a client signal mapping apparatus, including: an address comparator configured to determine whether a difference value between a first address for client data to be stored in a buffer and a second address for client data to be read from the buffer exceeds an acceptable limit value of the buffer; a data number decider configured to decide the number of client data to be mapped, depending on a determination result value; and a client signal mapper configured to map the client signal by changing a position of the determined client data in a client signal, based on the decided number of client data.

The client signal mapper may include: a down-shifter configured to down-shift client data located at a predefined position in the client signal; and an encoder configured to receive the decided number of client data at every OTU frame period, encode the down-shifted client data based on the received number of client data, and map the client signal containing the down-shifted client data. The down-shifter may include: a m-clock data delayer configured to delay a client data in the client signal for m numbers of clocks so as to down-shift a client data located at the Most Significant Bit (MSB) in the client signal; a data path selector configured to separate down-shifted client data and non-down-shifted client data in the client signal and select a data path of the client data; and a data storage configured to store the client data separately according to the selected data path.

When synchronous with a client terminal, the client signal mapper may include: a variable shifter configured to divide the client data in the client signal on a byte basis and up-shift or down-shift the client data; and an encoder configured to receive the decided number of client data at every OTU frame period, encode up-shifted first client data or down-shifted second client data based on the received number of client data, and map the client signal containing the first client data or the second client data. The variable shifter may perform the up-shift or the down-shift according to an increase or decrease of the first address or the second address.

The variable shifter may include: a data splitter configured to split respective byte-based client data into bit-based client data; a data aligner configured to receive the bit-based client data located at common positions at each byte-based client data, align the received bit-based client data on a basis of the byte-based client data, and up-shift or down-shift the bit-based client data located at a selected common position; and a data combiner configured to generate up-shifted or down-shifted byte-based client data by combining the aligned bit-based client data. The data aligner may be provided as many as the number of byte-based client data to be used in the mapping.

When asynchronous with the client terminal, the client signal mapper may further include: a byte usage determiner configured to determine a usage of a first byte or a second byte to be used in the mapping when asynchronous with the client terminal, depending on the determination result value; and a signal controller configured to control at least one value among the number of client data to be mapped, the increase or decrease of the first address, and the increase or decrease of the second address, depending on the determined usage of the first byte or the determined usage of the second byte. The variable shifter may up-shift or down-shift the client data according to the control of the signal controller. The client signal mapper may further include a synchronization determiner configured to determine whether synchronization with the client terminal is possible.

The client signal mapping apparatus may further include: a mode changer configured to change a mode related to the mapping, depending on whether the client signal mapper is synchronous with the client terminal while the client signal is being input from the client terminal. The mode changer may include: a driving controller configured to control the variable shifter to drive the data number decider; a module generator configured to generate a down-shift module for down-shifting client data located at a predefined position in the client signal; and a module controller configured to control the generated down-shift module to separate down-shifted client data and non-down-shifted client data and select a data path of the client data. The mode changer may further include: a determiner configured to determine whether the data number decider is provided; a generator configured to newly generate the data number decider when the data number decider is not provided; and a driving stop controller configured to stop driving the variable shifter and the byte usage determiner.

The client signal mapper may further include: a mode change information inserter configured to insert mode change information into an overhead so as to notify that a mode is changed by the mode changer.

When deciding the number of client data to be mapped, the data number decider may further use an OTU frame start notifying signal and a client clock.

The client signal mapping apparatus may further include: a first address generator configured to generate a first address with respect to first client data received thereto; a buffer configured to store the first client data based on the generated first address and read the first client data or prestored second client data upon mapping; and a second address generator configured to generate a second address with respect to the read second client data.

Another exemplary embodiment of the present invention provides a client signal mapping method, including: an address comparing step of determining whether a difference value between a first address for client data to be stored in a buffer and a second address for client data to be read from the buffer exceeds an acceptable limit value of the buffer; a data number deciding step of deciding the number of client data to be mapped, depending on a determination result value; and a client signal mapping step of mapping the client signal by changing a position of the determined client data in a client signal, based on the decided number of client data.

The client signal mapping step may include: a down-shift step of down-shifting client data located at a predefined position in the client signal; and an encoding step of receiving the decided number of client data at every OTU frame period, encoding the down-shifted client data based on the received number of client data, and mapping the client signal containing the down-shifted client data. The down-shift step may include: a m-clock data delaying step of delaying a client data in the client signal for m numbers of clocks so as to down-shift a client data located at the Most Significant Bit (MSB) in the client signal; a data path selecting step of separating down-shifted client data and non-down-shifted client data in the client signal and selecting a data path of the client data; and a data storing step of storing the client data separately according to the selected data path.

When a client signal mapper is synchronous with a client terminal, the client signal mapping step may include: a variable shift step of dividing the client data in the client signal on a byte basis and up-shifting or down-shifting the client data; and an encoding step of receiving the decided number of client data at every OTU frame period, encoding up-shifted first client data or down-shifted second client data based on the received number of client data, and mapping the client signal containing the first client data or the second client data. The variable shift step may perform the up-shift or the down-shift according to an increase or decrease of the first address or the second address. The variable shift step may include: a data splitting step of splitting respective byte-based client data into bit-based client data; a data aligning step of receiving the bit-based client data located at common positions at each byte-based client data, aligning the received bit-based client data on a basis of the byte-based client data, and up-shifting or down-shifting the bit-based client data located at a selected common position; and a data combining step of generating up-shifted or down-shifted byte-based client data by combining the aligned bit-based client data.

When a client signal mapper is asynchronous with the client terminal, the client signal mapping step may include: a byte usage determining step of determining a usage of a first byte or a second byte to be used in the mapping when asynchronous with the client terminal, depending on the determination result value; and a signal control step of controlling at least one value among the number of client data to be mapped, the increase or decrease of the first address, and the increase or decrease of the second address, depending on the determined usage of the first byte or the determined usage of the second byte. The client signal mapping method may further include: a mode change step of changing a mode related to the mapping, depending on whether to be synchronous with the client terminal while the client signal is being input from the client terminal. The mode change step may include: a driving control step of controlling a variable shifter performing the variable shift step to drive a data number decider performing the data number deciding step; a module generating step of generating a down-shift module for down-shifting client data located at a predefined position in the client signal; and a module control step of controlling the generated down-shift module to separate down-shifted client data and non-down-shifted client data and select a data path of the client data. The mode change step may include: a determining step of determining whether the data number decider is provided; a generating step of newly generating the data number decider when the data number decider is not provided; and a driving stop control step of stopping driving the variable shifter and the byte usage determiner.

The client signal mapping step may further include: a synchronization determining step of determining whether synchronization with the client terminal is possible.

When deciding the number of client data to be mapped, the data number deciding step may further use an OTU frame start notifying signal and a client clock.

The client signal mapping method may further include: a first address generating step of generating a first address with respect to first client data received thereto; a buffer executing step of storing the first client data based on the generated first address and reading the first client data or prestored second client data upon mapping; and a second address generating step of generating a second address with respect to the read second client data.

Exemplary embodiments of the present invention provide the client signal mapping apparatus and method having the same data path without regard to the client signals. The present invention may have the following effects.

First, the 40-Gbps client signal as well as the STM-256 signal may be mapped to the OPU3 payload through the single data path.

Second, since two mapping modes are supported using the single data path, the mapping mode may be changed while the client service is being provided.

Third, the mapping apparatus and method according to various exemplary embodiments of the present invention may be implemented with an optimal logic, depending on the client and mapping schemes. Power consumption may be reduced by removing or stopping unnecessary logic. In the case of FPGA, while one mapping apparatus is provided to one client, another mapping apparatus may be added within one FPGA by increasing a usable logic. That is, when the FPGA is initially used, the FPGA has a 40G throughput that can map the 40-Gbps client signal. However, by adding another independent mapping apparatus, the throughput may be increased to 80G while the FPGAS is used as it is.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
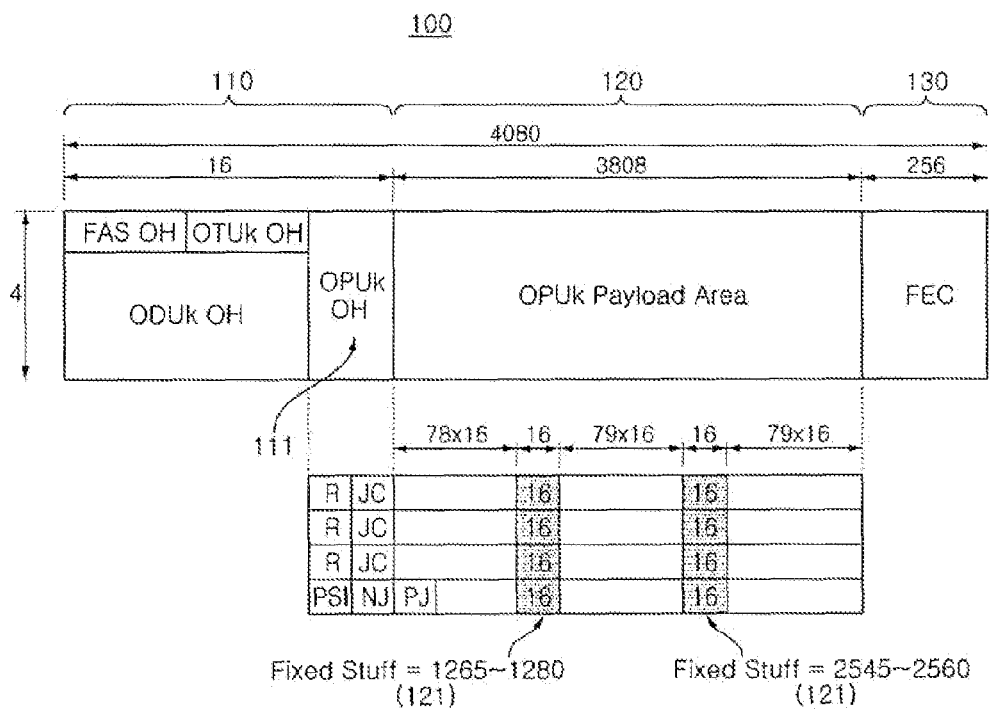
FIG. 1 illustrates an OTU3 frame structure and a frame structure for mapping an STM-256 signal to an OPU3 signal area.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 3:
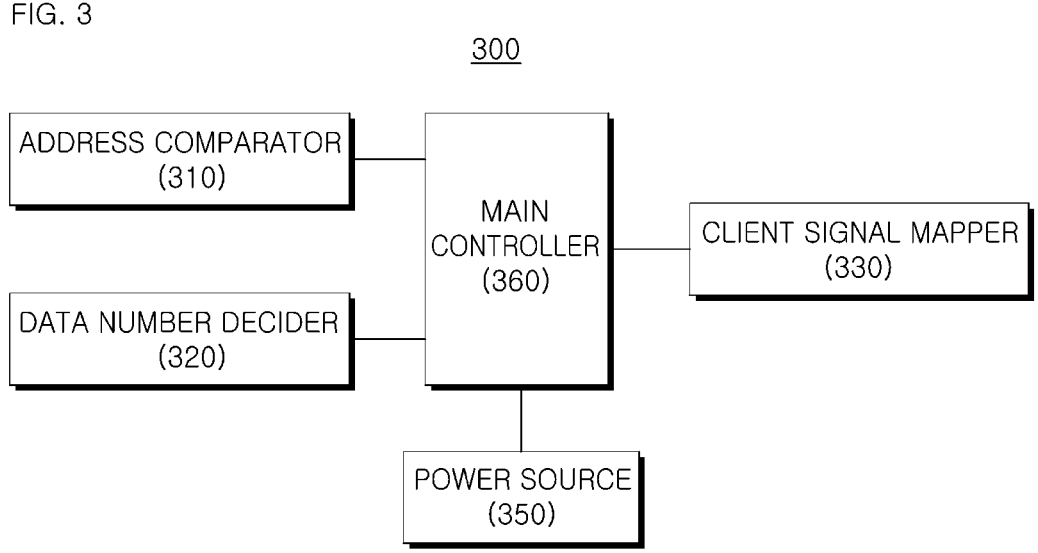
FIG. 3 is a block diagram schematically illustrating a client signal mapping apparatus according to an exemplary embodiment of the present invention.
Figure 4:
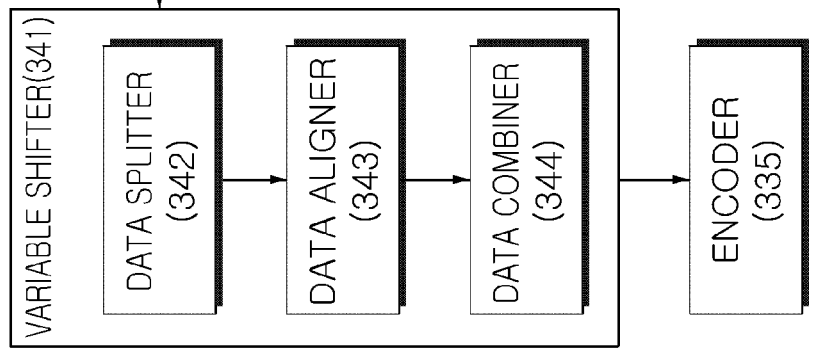
FIGS. 4 and 5 are block diagrams illustrating a detailed internal configuration of a client signal mapping apparatus according to an exemplary embodiment of the present invention.
Figure 4:
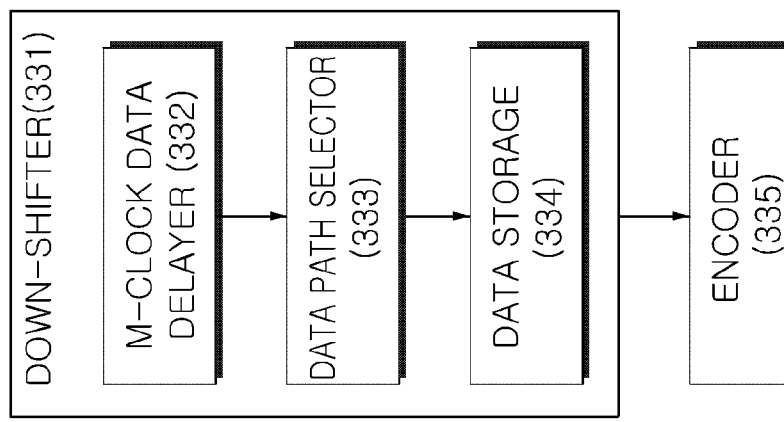
Figure 5:
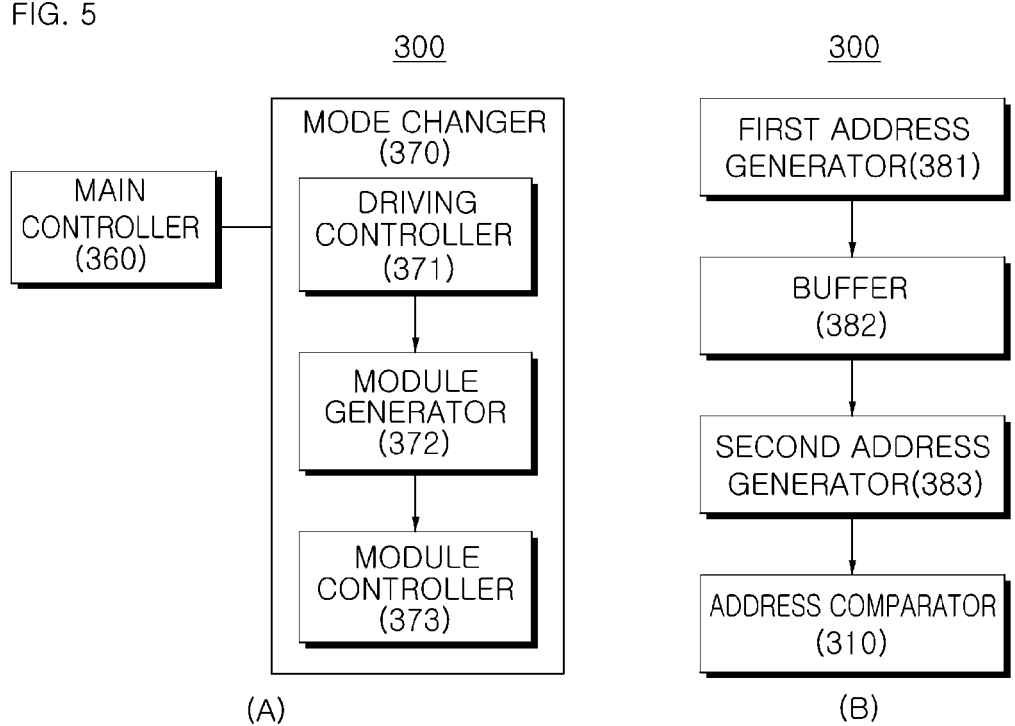

FIG. 3 is a block diagram schematically illustrating a client signal mapping apparatus according to an exemplary embodiment of the present invention. FIGS. 4 and 5 are block diagrams illustrating a detailed internal configuration of a client signal mapping apparatus according to an exemplary embodiment of the present invention. Exemplary embodiments of the present invention will be described below with reference to FIGS. 3 to 5.

Referring to FIG. 3, the client signal mapping apparatus 300 includes an address comparator 310, a data number decider 320, a client signal mapper 330, a power source 350, and a main controller 360.

The address comparator 310 functions to determine whether a difference value between a first address for client data to be stored in a buffer and a second address for client data to be read from the buffer exceeds an acceptable limit value of the buffer. The first address represents a write address (WA), and the second address represents a read address (RA).

The data number decider 320 functions to decide the number of client data to be mapped, depending on a determination result value of the address comparator 310. The data number decider 320 may be implemented with a Cm/CnD decision processor. The data number decider 320 decides Cm and CnD as the number of client data to be mapped. Cm represents the number of M-bytes in which a client signal is mapped to an OPU payload. Cn represents the number of bits to be actually mapped in the client signal. However, since the client signal is mapped on an M-byte basis, there occurs a difference between Cm and Cn. CnD is an option for improving timing performance by correcting the difference between Cm and Cn. Meanwhile, in the above, OPU represents an Optical channel Payload Unit.

When deciding the number of client data to be mapped, the data number decider 320 further uses a signal notifying an OTU frame start and a client clock. OTU represents an Optical channel Transport Unit.

The client signal mapper 330 functions to map the client signal by changing positions of the client data in the client signal, based on the number of client data decided by the data number decider 320. The client signal mapper 330 may be implemented by a combination of a 16-byte down-shifter and a JC encoder. When changing the position of the client signal, the client signal mapper 330 uses an elastic store read enable (e_REN) signal for controlling a buffer output and a select (sel) signal for controlling a down-shift.

When implemented with minimum logic, the client signal mapper 330, as illustrated in FIG. 4(A), may include a down-shifter 331 and an encoder 335.

The down-shifter 331 functions to down-shift the client data located at a predefined position in the client signal. The down-shifter 331 may be implemented with a 16-byte down-shifter.

The down-shifter 331 may include a m-clock data delayer 332, a data path selector 333, and a data storage 34. The m-clock data delayer 332 functions to delay a client data in the client signal for m numbers of clocks so as to down-shift the client data located at the Most Significant Bit (MSB) in the client signal. The data path selector 333 functions to separate down-shifted client data and non-down-shifted client data in the client signal and select a data path of the client data. The data storage 334 functions to store the client data separately according to the selected data path.

The encoder 335 functions to receive the number of client data at every OTU frame period, encode the down-shifted client data based on the received number of client data, and map the client signal containing the down-shifted client data. The encoder 335 may be implemented with a JC encoder.

When synchronous with a client terminal, the client signal mapper 330, as illustrated in FIG. 4(B), may include a variable shifter 341 and an encoder 335.

The variable shifter 341 functions to divide the client data in the client signal on a byte basis and up-shift or down-shift the client data. The variable shifter 341 performs the up-shift or the down-shift according to an increase or decrease of the first address or the second address. In this embodiment, the variable shifter 341 performs the up-shift and the down-shift by increasing or decreasing a shifter write address (s_wa) signal and a shifter read address (s_ra) signal at every clock according to whether a shifter write enable (s_wEN) signal is high.

The variable shifter 341 may include a data splitter 342, a data aligner 343, and a data combiner 344.

The data splitter 342 functions to split the respective byte-based client data into bit-based client data. The data splitter 342 may be implemented with a byte splitter.

The data aligner 343 functions to receive the bit-based client data located at common positions at each byte-based client data, align the received bit-based client data on a basis of the byte-based client data, and up-shift or down-shift the bit-based client data located at a selected common position. The data aligner 343 may be implemented with a bit aligner. In this case, an N:1 selector selects the bit-based client data to be shifted, and a data shifter shifts the selected bit-based client data. In this embodiment, the data aligner 343 may be provided as many as the number of byte-based client data to be used in the mapping.

The data combiner 344 functions to generate up-shifted or down-shifted byte-based client data by combining the aligned bit-based client data. The data combiner 344 may be implemented with a byte combiner.

The encoder 355 functions to receive the number of client data at every OTU frame period, encode up-shifted first client data or down-shifted second client data based on the received number of client data, and map the client signal containing the first client data or the second client data.

When asynchronous with a client terminal, the client signal mapper 330, as illustrated in FIG. 4(B), may further include a byte usage determiner 345 and a signal controller 346 as well as a variable shifter 341 and an encoder 335.

The byte usage determiner 345 functions to determine a usage of a first byte or a second byte to be used in the mapping when asynchronous with the client terminal, depending on a determination result value. The byte usage determiner 345 may be implemented with an NJ/PJ decision processor. The byte usage determiner 345 may determine whether the first byte or the second byte is used as data or stuff. The first byte represents an NJ byte, and the second byte represents a PJ byte.

The signal controller 346 functions to control at least one value among the number of client data to be mapped, the increase or decrease of the first address, and the increase or decrease of the second address, depending on the determined usage of the first byte or the determined usage of the second byte. The signal controller 346 may be implemented with an N:1 selector. For example, N may be 2.

As described above, in the case where the client signal mapper 330 further includes the byte usage determiner 345 and the signal controller 346, the variable shifter 341 up-shifts or down-shifts the client data according to the control of the signal controller 346.

In this embodiment, the configuration of the client signal mapper 330 is changed depending on whether the client signal mapper 330 is synchronous with the client terminal. Considering this point, the client signal mapping apparatus 300, as illustrated in FIG. 5(A), may further include a mode changer 370.

The mode changer 370 functions to change a mode related to the mapping, depending on whether the client signal mapper 330 is synchronous with the client terminal while the client signal is being input from the client terminal.

The mode changer 370 may include a driving controller 371, a module generator 372, and a module controller 373. The driving controller 371 functions to control the variable shifter 341 to drive the data number decider 320. The module generator 372 functions to generate a down-shift module for down-shifting client data located at a predefined position in the client signal. The down-shift module is the same concept as the down-shifter 331. The module controller 373 functions to control the down-shift module to separate down-shifted client data and non-down-shifted client data and select a data path of the client data.

The mode changer 370 may further include a determiner, a generator, and a driving stop controller. The determiner functions to determine whether the data number decider 320 is provided. The generator functions to newly generate the data number decider 320 when the data number decider 320 is not provided. The driving stop controller functions to stop driving the variable shifter 341 and the byte usage determiner 345.

The mode changer will be described below in more detail with reference to FIG. 14.

Meanwhile, the client signal mapper 330 may further include a synchronization determiner. The synchronization determiner functions to determine whether the synchronization with the client terminal is possible. The synchronization determiner will be described below in more detail with reference to FIG. 15.

The client signal mapping apparatus 300, as illustrated in FIG. 5(B), may further include a first address generator 381, a buffer 382, and a second address generator 383. The first address generator 381 functions to generate a first address with respect to first client data received thereto. The first address generator 381 may be implemented with an elastic store write address (WA) generator. The buffer 382 functions to store the first client data based on the generated first address and read the first client data or prestored second client data upon mapping. The buffer 382 may be implemented with an elastic store. The second address generator 383 functions to generate a second address with respect to the read second client data. The second address generator 383 may be implemented with an elastic store read address (RA) generator.

Next, the client signal mapping apparatus 300 according to an exemplary embodiment of the present invention will be described. The present invention is exemplarily configured for an OTU3 signal having a transmission rate of 43 Gbps among the OTN signals having been standardized till now.

Figure 6:
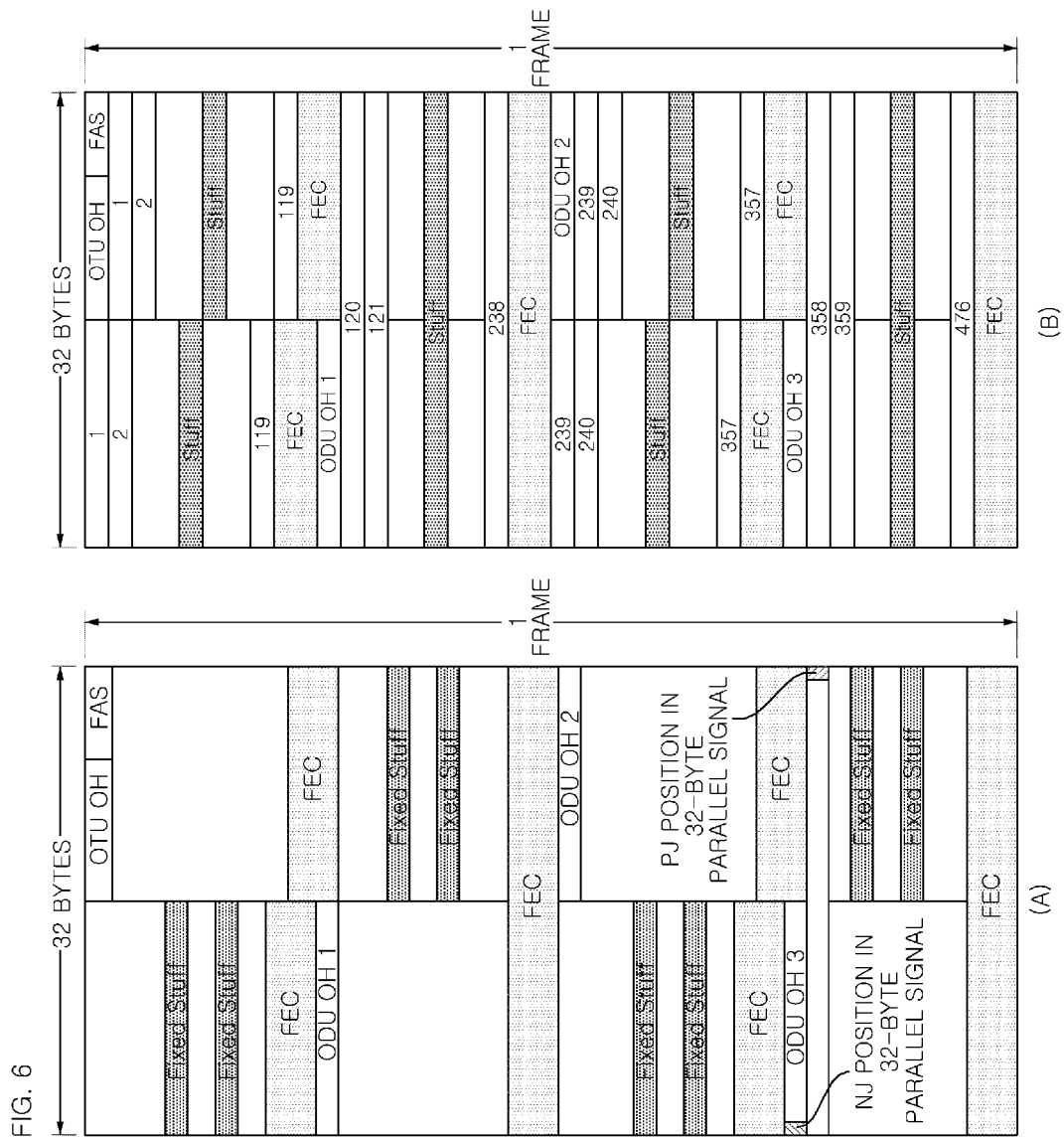
FIG. 6 illustrates the frame structures of FIGS. 1 and 2 in a 32-byte parallel signal form.

According to the frame structure of FIG. 1, since each of NJ and PJ is made up of a single byte, it is easy to extract an STM-256 signal from the OPU3 signal on a byte basis. That is, one clock of a corresponding position is subtracted or added. However, it is difficult to process signals of 40 Gbps or more, on a byte basis, using the existing CMOS technology because an operating speed is very high. Therefore, it is advantageous to process signals on a multiple-byte basis. FIG. 6(A) illustrates the frame structure of FIG. 1 in a 32-byte parallel signal form.

When implemented with multiple byte parallel signals, the frame structure is suitable for a high-speed signal design. However, as can be seen from FIG. 6(A), 1 byte of each of the NJ byte and the PJ byte may exist together with actual data at the same bit time due to the features of the frame structure. In addition to the NJ byte and the PJ byte, a 16-byte fixed stuff may also be located together with 16-byte actual data. Therefore, in order to process the NJ byte, the PJ byte, and the 16-byte of the fixed stuff, 1-byte data should be added to or subtracted from the 32-byte data, or 16-byte data should be subtracted.

Figure 2:
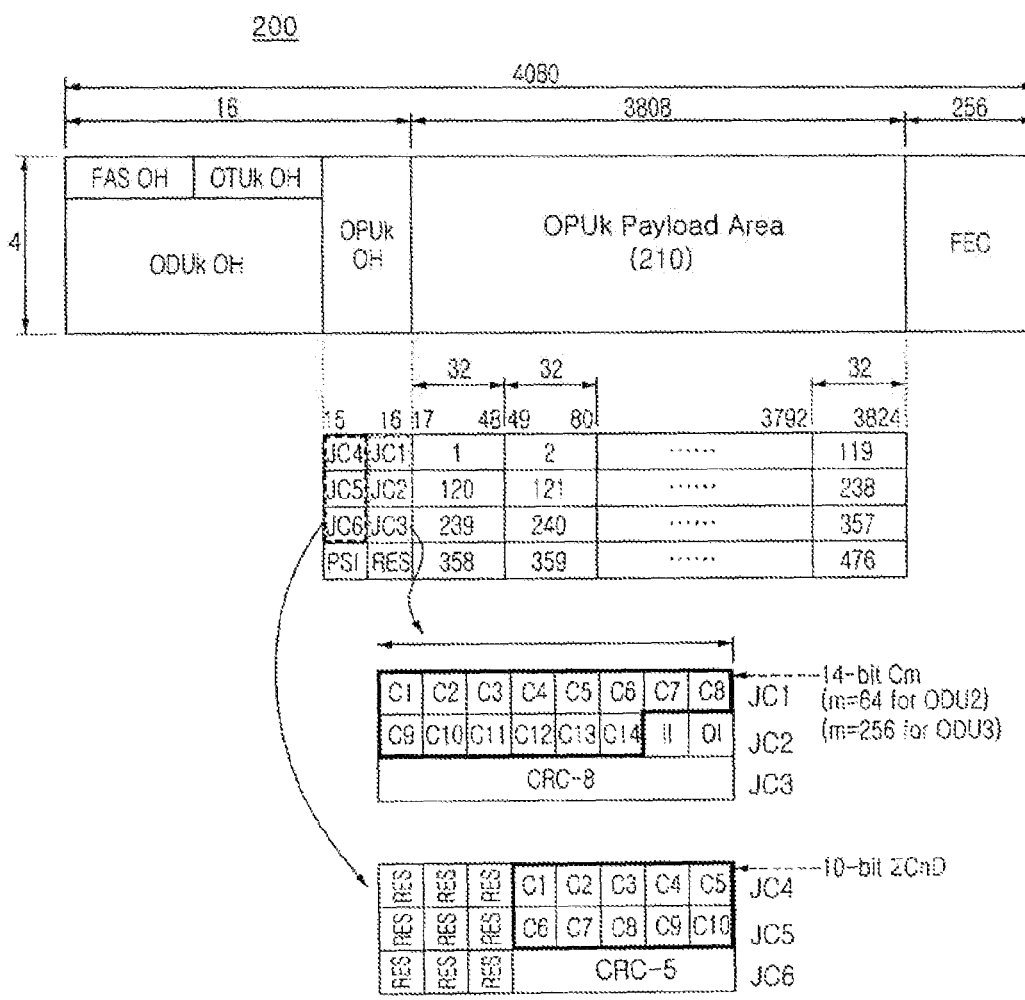
FIG. 2 illustrates a frame structure for mapping a 40-Gbps client signal, except for an STM-256 signal, to an OPU3 signal area.

FIG. 6(B) illustrates the frame structure of FIG. 2 in a 32-byte parallel signal form.

Although the client signal is mapped to the OPU3 frame on a basis of 32-byte data and 32-byte stuff, 32-byte data may be shifted by 16 bytes because 16-byte overheads of ODU3 and OTU3 and FEC parity bytes exist.

Meanwhile, the transmission rate of STM-265 is 39.81312 Gbit/s±20 ppm, and the transmission amount of OPU3 payload is approximately 40.149716 Gbit/s±20 ppm. Since 476 M-bytes exist in the OPU3 payload area, a nominal Cm value when the STM-256 signal is mapped to the OPU3 payload is 472(=39.81312÷40.149716×476) on average. Considering a clock error of ±20 ppm, Cm has the minimum value of 471 and the maximum value of 473. Therefore, the STM-256 signal is not mapped as illustrated in FIG. 1, but the STM-256 signal is mapped as if it is a 40-Gbps client signal having a Cm value of 471 to 473, as illustrated in FIG. 2. As such, the same mapping apparatus may be implemented without considering all of the 40-Gbps client signals as well as the STM-256 signal.

Figure 7:
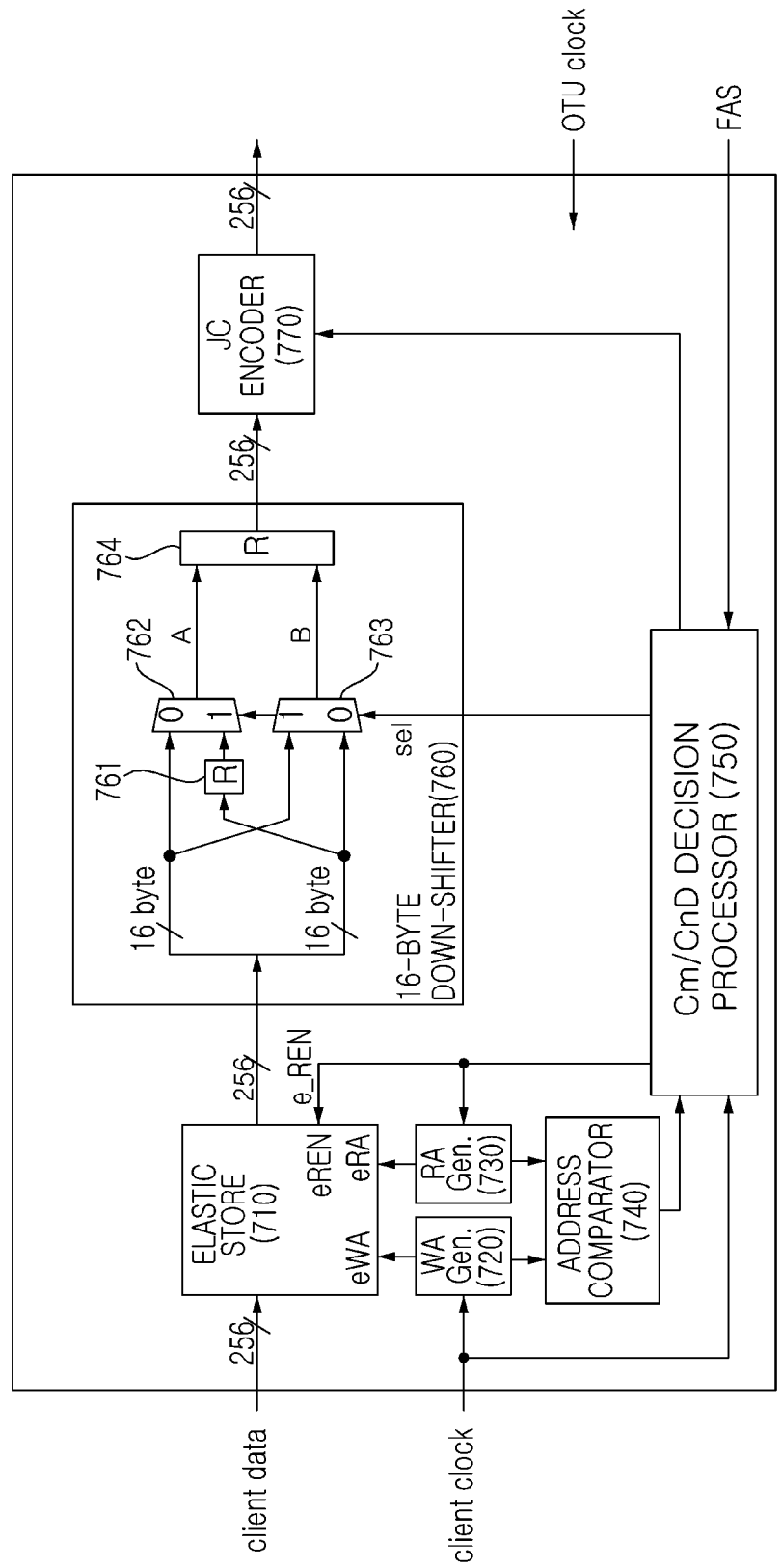
FIG. 7 is a block diagram of an apparatus for mapping an STM-256 signal and all 40-Gbps client signals with minimum logic according to a first embodiment of the present invention.

FIG. 7 is a block diagram of an apparatus for mapping an STM-256 signal and all 40-Gbps client signals with minimum logic according to a first embodiment of the present invention.

Referring to FIG. 7, the mapping apparatus 700 includes an elastic store 710, an elastic store write address (WA) generator 720, an elastic store read address (RA) generator 730, an address comparator 740, a Cm/CnD decision processor 750, a 16-byte down-shifter 760, and a JC encoder 770. In this embodiment, the mapping apparatus 700 receives a 256-bit (32-byte) parallel signal.

The elastic store 710 functions to store received client data and output data at data mapping timing. The elastic store write address generator 720 generates a write address (WA) such that the received client data is stored in the elastic store 710. The elastic store read address generator 730 generates an address of data to be read from the elastic store 710. The address comparator 740 compares a difference between WA and RA, which are respectively generated from the elastic store write address generator 720 and the elastic store read address generator 730, determines whether the difference exceeds a store limit value, and transfers a determination signal to the Cm/CnD decision processor 750. The Cm/CnD decision processor 750 may determine the number of client data to be mapped, that is, the Cm and CnD values, using an FAS signal indicating each OTU frame start, a received client clock, and the determination signal generated by the address comparator 740 as a result of determination as to whether the difference exceeds the elastic store limit value. The Cm/CnD decision processor 750 transfers the determined Cm and CnD values to the JC encoder 770. In addition, the Cm/CnD decision processor 750 generates an elastic store read enable (e_REN) signal for controlling the output of the elastic store 710 and a sel signal for controlling the 16-byte down-shifter 760 according to the determined Cm value in order for mapping. Timing of the e_REN signal and the sel signal will be described below with reference to FIG. 8. The 16-byte down-shifter 760 functions to down-shift 32-byte data output from the elastic store 710 by 16 bytes at a predetermined section and to directly map the 32-byte data output from the elastic store 710 at a predetermined section, in order that the mapping is achieved as illustrated in FIG. 6(B). The JC encoder 770 functions to receive Cm and CnD values, which are to be used during a next OTU frame period, from the Cm/CnD decision processor 750, and encode the received Cm and CnD values into JC1-JC6 bytes of the OTUk frame of FIG. 2.

The 16-byte down-shifter 760 includes a 1-clock data delayer 761, data selectors 762 and 763, and a register 764 storing 256 bits. The 1-clock data delayer 761 delays 16 bytes located at LSB in 32-byte data for 1 clock such that 16 bytes located at MSB in 32-byte data are down-shifted and the remaining 16-byte data is mapped in a next clock. Instead of the 1-clock data delayer 761, a register may be provided. The data selectors 762 and 763 functions to select a data path such that the 32-byte data output from the elastic store 710 is directly mapped or is down-shifted by 16 bytes according to the received sel signal. The data selected by the data selectors 762 and 763 are stored in the register 764. Finally, the signal form as illustrated in FIG. 6(B) is made.

Figure 8:
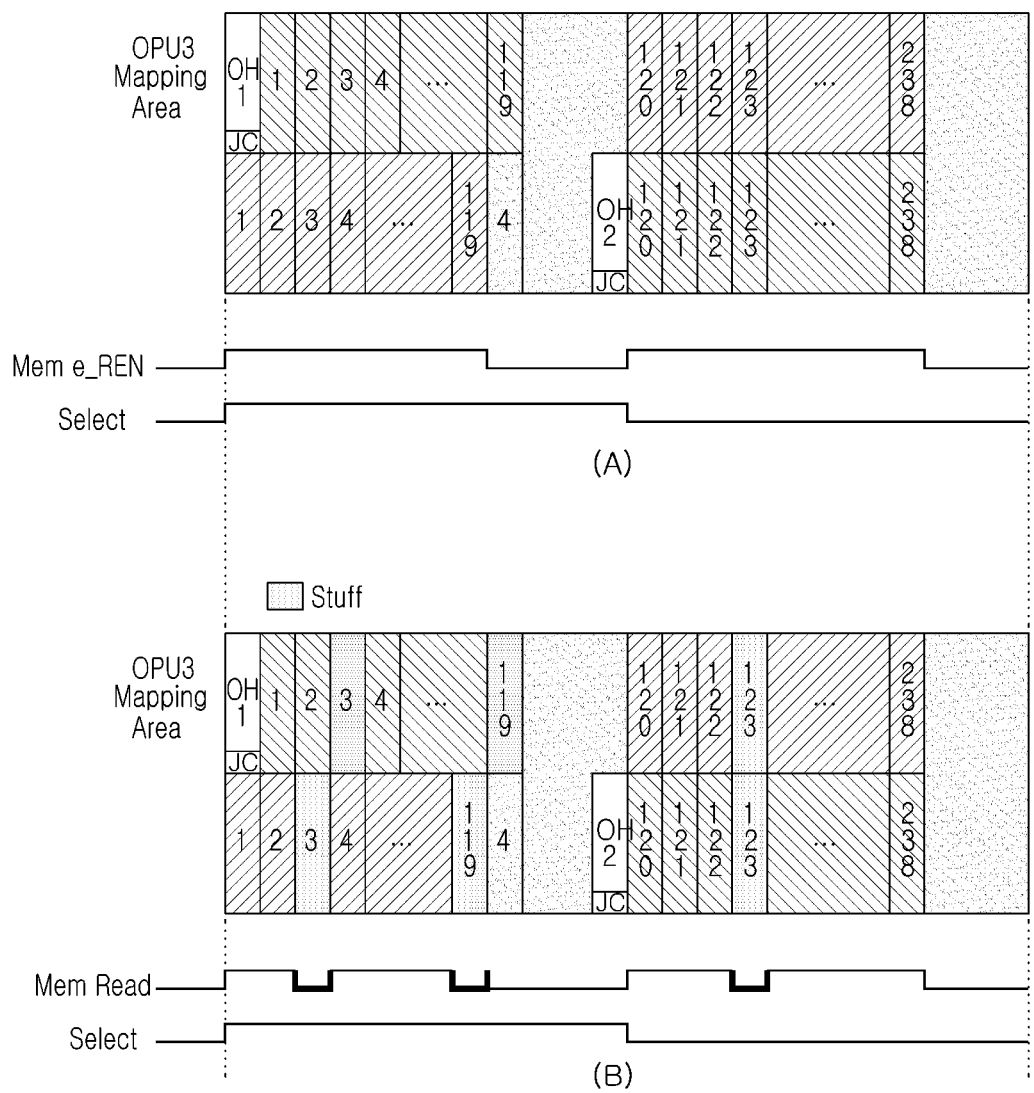
FIG. 8 is an exemplary diagram explaining the operation of the mapping apparatus illustrated in FIG. 7.

FIG. 8 is an exemplary diagram explaining the operation of the mapping apparatus 700 illustrated in FIG. 7. FIG. 8(A) illustrates a mapping output form without stuff, and FIG. 8(B) illustrates a mapping output form when stuff is generated.

FIG. 8(A) illustrates an OTUk output form upon mapping without stuff and a timing diagram of e_REN and sel signals output from the Cm/CnD decision processor 750 according to the OTUk output form. At the first row of a frame, the sel signal is high in order for a 16-byte down-shift. 32-byte data is read from the elastic store 710. The e_REN signal is low from a section in which the FEC parity byte is inserted, and the client data is not read from the elastic store 710. At the second row of the frame, the e_REN signal is high after a 16-byte overhead position, and client data is read from the elastic store 710 on a 32-byte basis, and the sel signal is low. Therefore, the 32-byte client data output from the elastic store 710 is directly mapped to an OTUk frame, without 16-byte down-shift. Likewise, the e_REN signal is low after a position of the FEC parity byte at the second row, and the client data is not read from the elastic store 710.

FIG. 8(B) illustrates an OTUk output form, when 32-byte stuff is generated upon mapping the client signal, and a timing diagram of the e_REN signal and the sel signal output from the Cm/CnD decision processor 750 according to the OTUk output form. In a section where no stuff is generated, the timing diagram is equal to that of FIG. 8(A). If 32-byte stuff is generated, the e_REN signal is low in the corresponding timing, and the client data is not read from the elastic store 710. That is, the sel signal always has the same timing, without considering the generation of the stuff.

As described above, the 40-Gbps client signals as well as the STM-256 signal may be mapped to the OPU3 payload by using the mapping apparatus 700 of FIG. 7.

Figure 9:
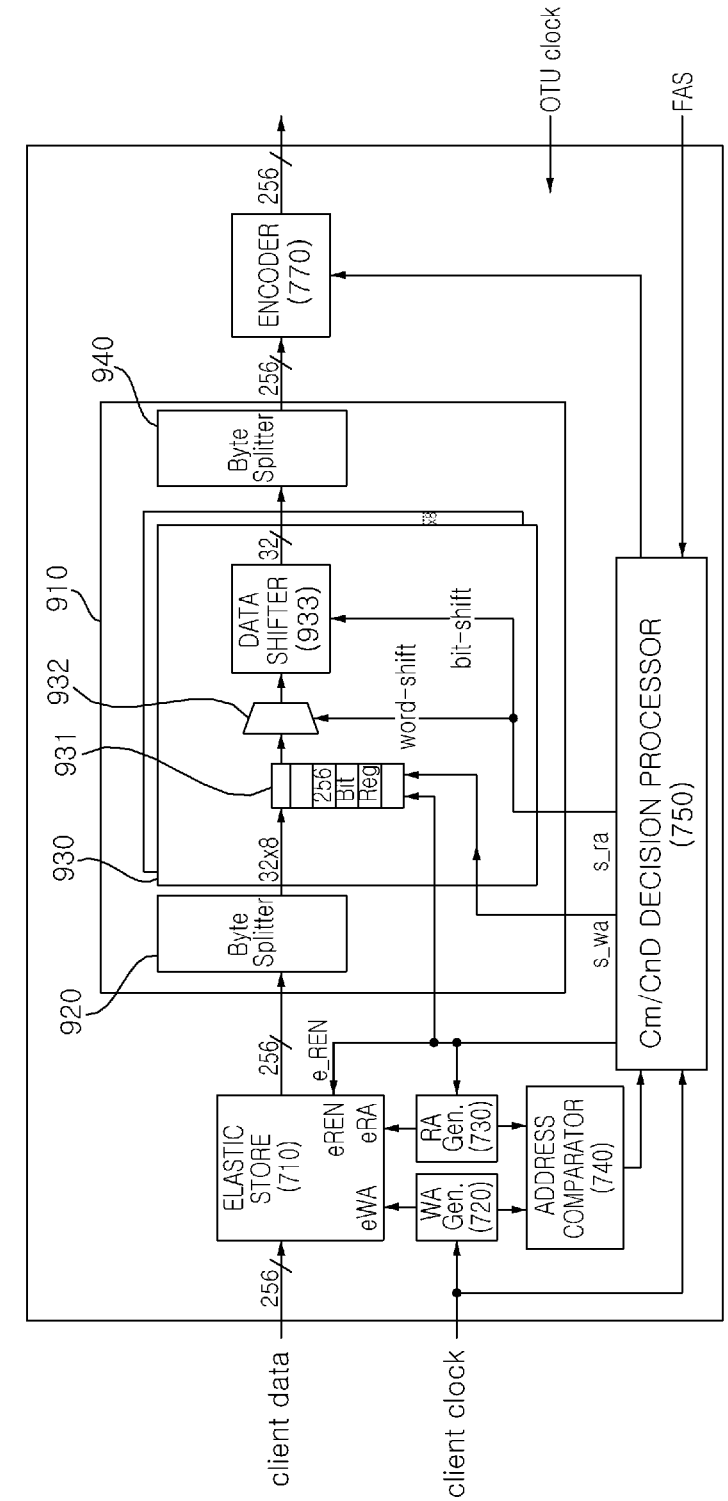
FIG. 9 is a block diagram of an apparatus for mapping an STM-256 signal and all 40-Gbps client signals according to a second embodiment of the present invention.

FIG. 9 is a block diagram of an apparatus 900 for mapping an STM-256 signal and all 40-Gbps client signals according to a second embodiment of the present invention. The mapping apparatus 900 of FIG. 9 may implement the same function as the mapping apparatus of FIG. 7 by using a variable shifter 910 instead of the 16-byte down-shifter 760. While the 16-byte down-shifter 760 supports only the function of down-shifting the entire 16 bytes, the variable shifter 910 also supports an up- or down-shift on a byte basis. A shifter write enable (s_wEN) signal, a shifter write address (s_wa) signal, and a shifter read address (s_ra) signal, which are input to the variable shifter 910, are provided from the Cm/CnD decision processor 750. When the s_wEN signal is high, s_wa is increased by 32 at every clock. If no shift is generated, s_ra is also increased by 32 at every clock when the s_wEN signal is high. If s_ra is increased by not +32 but +1, a 1-byte up-shift effect may be obtained. If s_ra is increased by +16, it is the same as the 16-byte up-shift.

The variable shifter 910 includes a byte splitter 920, bit aligners 930, and a byte combiner 940. The byte splitter 920 splits each byte into 8 bits and inputs the respective bits to eight bit aligners. That is, 32-byte data is input to the byte splitter 920, and the Most Significant Bits (MSBs) of the respective 32 bytes are input to the first bit aligner. The second bits of the respective 32 bytes are input to the second bit aligner. In such a manner, the Least Significant Bits (LSBs) of the respective 32 bytes are input to the last eighth bit aligner. When one byte is split into 8 bits, the byte-based shift effect may be obtained by equally shifting all the bit aligners. The byte combiner 940 performs a reverse function of the byte splitter 920 to maintain the original data sequence.

The bit aligner 930 includes a 256-bit register 931 storing 256 bits, an 8:1 selector 932 selecting 32 signals among the signals stored in the 256-bit register 931, and a data shifter 933 shifting the selected bits on a bit basis. When s_ra is increased by +32 at every clock, that is, s_ra is increased by "001 00000", word-shift, which is the upper 3 bits, is increased by 1 at every clock. Therefore, the 8:1 selector 932 selects new 32 signals at each time. On the other hand, since bit-shift, which is the lower 5 bits, becomes +0, there is no change in the value. Therefore, the data shifter 933 maintains the previous state. That is, it can be known that no shift is generated when s_ra is increased by +32 at every clock. If s_ra is increased by +16 in one clock, that is, s_ra is increased by "000 10000", the upper 3 bits are not increased or decreased. Therefore, the 8:1 selector 932 again reads the previous 32 signal data. Since the lower 5 bits are increased by +16, the data shifter 933 performs a 16-bit up-shift. That is, when s_ra is increased by +1 in one clock, the data shifter 933 performs a 16-byte up-shift.

Figure 10:
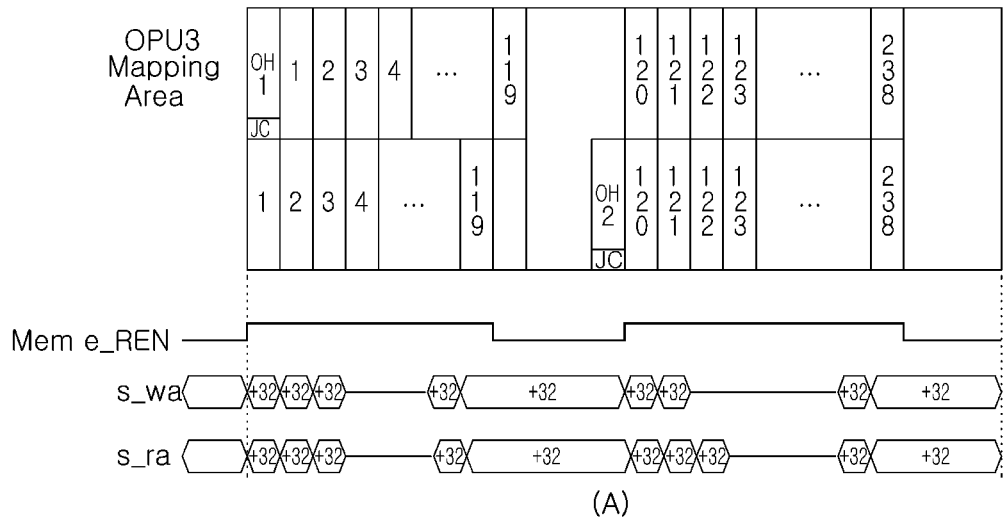
FIG. 10 is an exemplary diagram explaining the operation of the mapping apparatus illustrated in FIG. 9.
Figure 10:
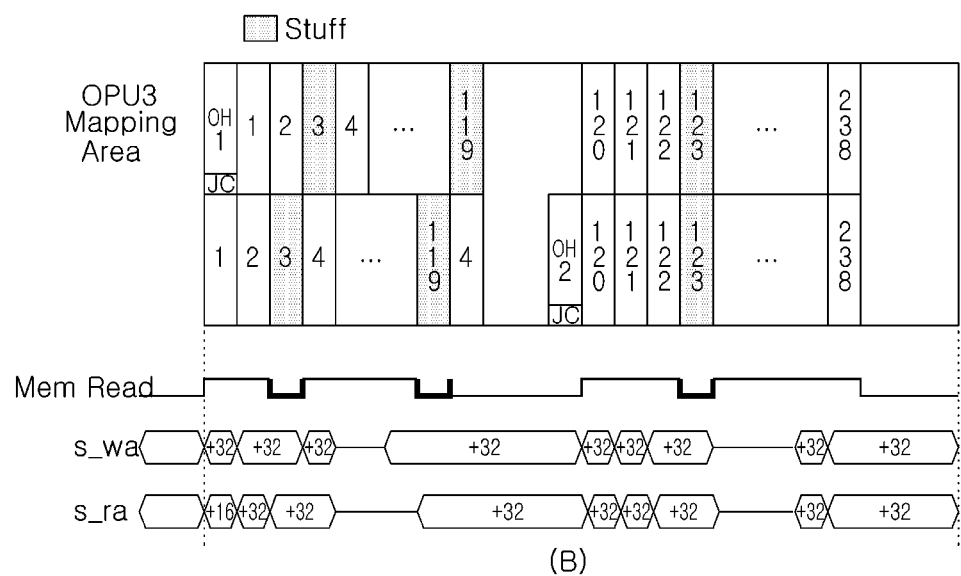

FIG. 10 is an exemplary diagram explaining the operation of the mapping apparatus 900 of FIG. 9. FIG. 10(A) illustrates a mapping output form without stuff, and FIG. 10(B) illustrates a mapping output form when stuff is generated.

FIG. 10(A) illustrates an OTUk output form upon mapping without stuff and a timing diagram of e_REN, s_wa and s_ra signals output from the Cm/CnD decision processor 750 according to the OTUk output form. At the first row of a frame, the e_REN signal is high, and 32-byte client data is read from the elastic store 710. s_wa is increased by +32, and the 32-byte client data read from the elastic store 710 is stored in eight 256-bit registers 931. At this time, at the first row and first column of the frame, a 16-byte up-shift is performed by increasing s_ra by +16, such that only the lower 16 bytes of the client data are mapped at the first column. From the second column, 32 bytes are mapped, without shifting, by increasing s_ra by +32. After the section in which the FEC parity byte is inserted, the e_REN signal is low, and no client data is read from the elastic store 710. The value of s_wa is not increased, and the value of s_ra is not increased from a next clock. Therefore, dummy data is mapped to the FEC parity area. At the second row of the frame, the e_REN signal is high from the second column after the 16-byte overhead position, and the client data is read from the elastic store 710 on a 32-byte basis again. s_wa is increased by +32, and the 32-byte client data read from the elastic store 710 is stored in the eight 256-bit registers 931. In addition, at the second row and second column of the frame, a 16-byte up-shift is performed by increasing s_ra by +16. Therefore, the effect of the 32-byte up-shift, including the 16-byte up-shift at the first row, may be obtained. From the third column, 32 bytes are mapped, without shifting, by increasing s_ra by +32. From the section in which the FEC parity byte is located at the second row, the e_REN signal is low, and no client data is read from the elastic store 710. The values of s_wa and s_ra are not increased. Therefore, dummy data is mapped to the FEC parity area.

FIG. 10(B) illustrates an OTUk output form, when 32-byte stuff is generated upon mapping the client signal, and a timing diagram of the e_REN, s_wa and s_ra signals output from the Cm/CnD decision processor 750 according to the OTUk output form. In a section where no stuff is generated, the timing diagram is equal to that of FIG. 10(A). If 32-byte stuff is generated, the e_REN signal is low in the corresponding timing, and the client data is not read from the elastic store 710. At the same time, the value of s_wa is not increased, and no data is stored in the 256-bit register 931. s_ra is slightly different in operation at the first row and the second row. When the e_REN signal is low in the mapping area at the first row, the value of s_ra is increased in an existing manner at a point of time when e_REN is low. The value of s_ra is not increased at a next clock. At the first row, the upper 16 bytes of data should be mapped at a point of time when e_REN is low. At this time, the read lower 16 bytes are mapped at a next clock. On the other hand, when the e_REN signal is low in the mapping area at the second row, the value of s_ra is not increased at a point of time when the e_REN signal is low, just like e_wa. At the second row, the 32-byte stuff should be located at a point of time when e_REN is low. Therefore, s_ra need not be increased.

As described above with reference to FIGS. 9 and 10, the 40-Gbps client signals as well as the STM-256 signal may be mapped to the OPU3 payload even though the variable shifter requiring a slightly more logic capacity is used instead of the 16-byte down-shifter.

Figure 11:
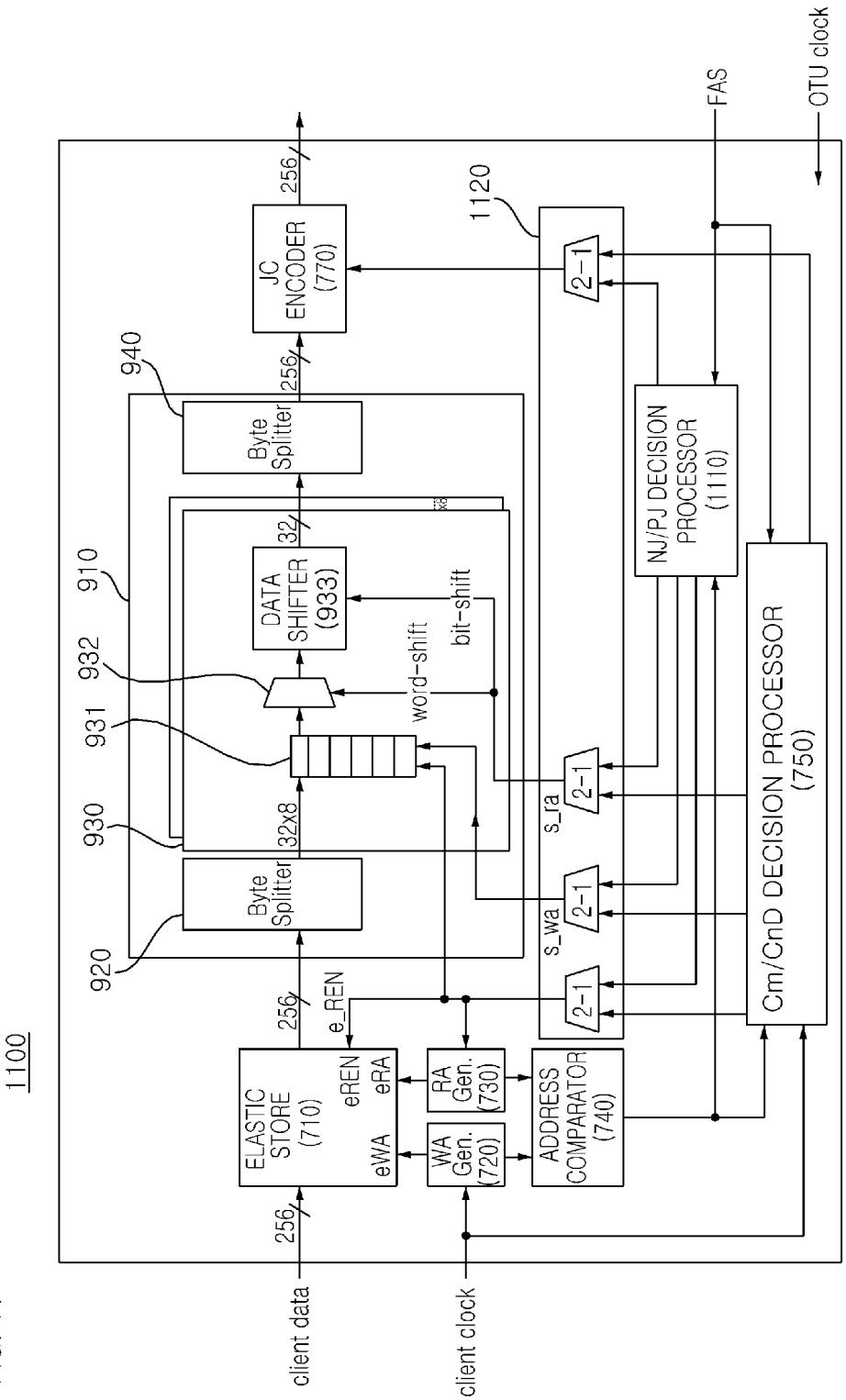
FIG. 11 is a block diagram of an apparatus for mapping an STM-256 signal and all 40-Gbps client signals according to a third embodiment of the present invention.

FIG. 11 is a block diagram of an apparatus 1100 for mapping an STM-256 signal and all 40-Gbps client signals according to a third embodiment of the present invention. The mapping apparatus 700 according to the first embodiment and the mapping apparatus 900 according to the second embodiment support not the mapping structure of FIG. 1 or 3 but the SDH signal mapping by detour. Therefore, the two mapping apparatuses 700 and 900 in which the STM-256 signal is mapped to OPU3 in the existing transport network by the scheme of FIG. 1 are not compatible. In the exemplary embodiment, considering this point, the mapping apparatus 1100 of FIG. 11 is used when interfacing with other devices over an external network as well as an internal network. Referring to FIG. 11, the mapping apparatus 1100 includes an elastic store 710, an elastic store write address (WA) generator 720, an elastic store read address (RA) generator 730, an address comparator 740, a Cm/CnD decision processor 750, an NJ/PJ decision processor 1110, a variable shifter 910, a JC encoder 770, and a 2:1 selector 1120.

When compared with the mapping apparatus 900 of FIG. 9, the mapping apparatus 1100 of FIG. 11 further includes the NJ/PJ decision processor 1110 and the 2:1 selector 1120. The NJ/PJ decision processor 1110 may determine whether NJ or PJ byte is used as stuff or data, depending on a determination signal regarding whether a difference between addresses exceeds the limit value of the elastic store 710. The determination signal is input from the address comparator 740. The NJ or PJ decision values are transferred to the JC encoder 770 through the 2:1 selector 1120. In addition, an elastic store read enable (e_REN) signal for controlling the output of the elastic store 710 and s_wa and s_ra signals for controlling the variable shifter 910 are generated depending on the NJ or PJ decision and are transferred to the variable shifter 910. The 2:1 selector 1120 functions to select one signal among e_REN, s_wa, s_ra, Cm and CnD signals output from the Cm/CnD decision processor 750 and e_REN, s_wa, s_ra, NJ and PJ signals output from the NJ/PJ decision processor 1110, depending on a selected mapping mode. That is, when the STM-256 signal is mapped in an NJ/PJ mapping mode as in the case of FIG. 1, the 2:1 selector 1120 selects the e_REN, s_wa, s_ra, NJ and PJ signals output from the NJ/PJ decision processor 1110. On the other hand, when the 40-Gbps including the STM-256 signal is mapped in a Cm/CnD mapping mode as in the case of FIG. 2, the 2:1 selector 1120 selects the e_REN, s_wa, s_ra, Cm and CnD signals output from the Cm/CnD decision processor 750.

Figure 12:
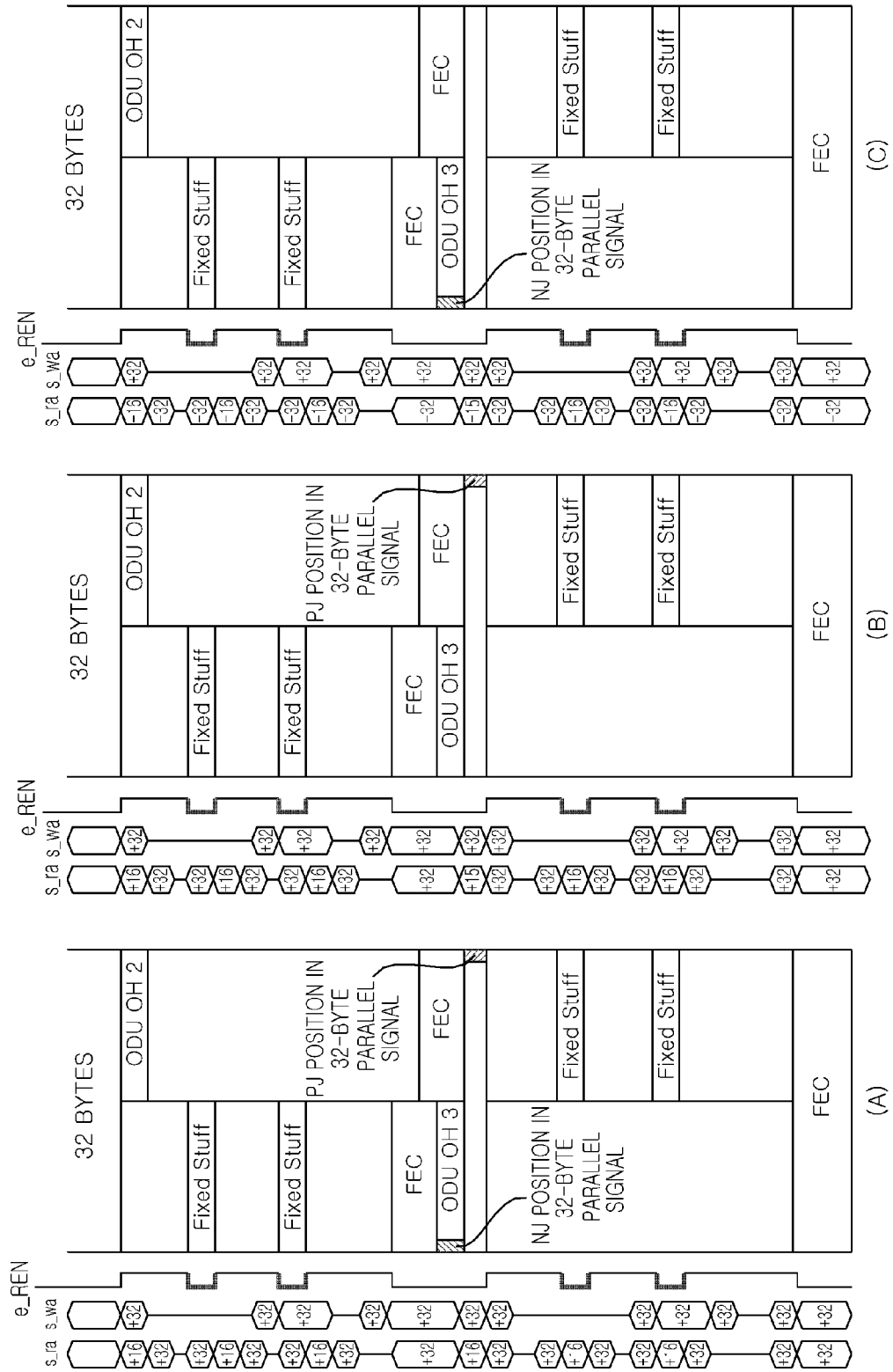
FIG. 12 is an exemplary diagram explaining the operation of the mapping apparatus illustrated in FIG. 11 in an NJ/PJ mapping mode.

FIG. 12 is an exemplary diagram explaining the operation of the mapping apparatus 1100 of FIG. 11 in an NJ/PJ mapping mode. FIG. 12(A) illustrates a mapping output form when the NJ byte is stuff and the PJ byte is data. FIG. 12(B) illustrates a mapping output form when the NJ byte is stuff and the PJ byte is stuff. FIG. 12(C) illustrates a mapping output form when the NJ byte is data and the PJ byte is data.

When the mapping apparatus 1100 operates in the Cm/CnD mapping mode, the 2:1 selector 1120 selects the e_REN, s_wa, s_ra, Cm and CnD signals output from the Cm/CnD decision processor 750. This operation is equal to that of FIG. 10. When the mapping apparatus 1100 operates in the NJ/PJ mapping mode, the 2:1 selector 1120 selects the e_REN, s_wa, s_ra, NJ and PJ signals output from the NJ/PJ decision processor 1110.

FIG. 12(A) illustrates an OTUk output form, when the NJ byte is stuff and the PJ byte is data, and a timing diagram of the e_REN, s_wa and s_ra signals output from the NJ/PJ decision processor 1110 according to the OTUk output form. At the first row of a frame, the e_REN signal is high, and 32-byte client data is read from the elastic store 710. s_wa is increased by +32, and the 32-byte client data read from the elastic store 710 is stored in eight 256-bit registers 931. At this time, at the first row and first column of the frame, a 16-byte up-shift is performed by increasing s_ra by +16, such that only the lower 16 bytes of the client data are mapped at the first column. From the second column, 32 bytes are mapped, without shifting, by increasing s_ra by +32. In the NJ/PJ mapping mode, two 16-byte fixed stuffs are located in the middle of the first row, and the e_REN signal is low at the timing when the fixed stuffs are generated. s_wa is increased by +32 at the first 16-byte fixed stuff of the first row, and the client data is stored in the 256-bit register 931. On the other hand, s_wa is not increased at a point of time when the second 16-byte fixed stuff is generated. A 16-byte up-shift is performed by increasing s_ra by +16 at a next clock after the first and second 16-byte fixed stuffs of the first row are generated. If s_ra is increased by +16 at the next clock, data may be mapped after the fixed stuff byte. The section in which the FEC parity byte is inserted is the same as the existing case. At the second row of the frame, the e_REN signal is high from the second column after the 16-byte overhead position, and the client data is read from the elastic store 710 on a 32-byte basis. s_wa is increased by +32, and the 32-byte client data read from the elastic store 710 is stored in the eight 256-bit registers 931. In the NJ/PJ mapping mode, two 16-byte fixed stuffs are located in the middle of the second row, and the e_REN signal is low at the timing when the fixed stuffs are generated. s_wa is increased by +32 in the first 16-byte fixed stuff of the second row, and the client data is stored in the 256-bit register 931. On the other hand, s_wa is not increased at a point of time when the second 16-byte fixed stuff is generated. A 16-byte up-shift is performed by increasing s_ra by +16 at a point of time when the first and second 16-byte fixed stuffs of the second row are generated. Therefore, dummy data, i.e., 16-byte stuff, is located at the upper 16 bytes, and data is mapped at the lower 16 bytes.

FIG. 12(B) illustrates an OTUk output form, when the NJ and PJ bytes are stuffs, and a timing diagram of the e_REN, s_wa and s_ra signals output from the NJ/PJ decision processor 1110 according to the OTUk output form. FIG. 12(B) is substantially identical to FIG. 12(A), except that s_ra is increased by +15 such that MSB 1 byte among 32 bytes is not filled with data but with stuff at the second row of the fourth row at which the PJ byte is located as the stuff byte.

FIG. 12(C) illustrates an OTUk output form, when the NJ and PJ bytes are data, and a timing diagram of the e_REN, s_wa and s_ra signals output from the NJ/PJ decision processor 1110 according to the OTUk output form. FIG. 12(C) is substantially identical to FIG. 12(A), except that 1-byte data is mapped at the NJ byte position. At the first row of the fourth row, the lower 16 bytes are located as overhead. At this time, s_ra is decreased by −15 such that data is mapped to LSB 1 byte as NJ byte.

The apparatus for mapping the 40-Gbps client signal, including the STM-256 signal, to OPU3 using the same data path has been described above.

In particular, since two mapping modes exist, mapping is possible without separate data paths for the mapping modes. In addition, when the mapping apparatus of FIG. 11 is used, the STM-256 signal may be mapped to OPU3 by two mapping schemes: the Cm/CnD mapping scheme and the NJ/PJ mapping scheme. When interfacing with the external network, the interface is performed by the NJ/PJ mapping scheme. When interfacing with the internal network, the Cm/CnD mapping scheme is used. Therefore, the mapping apparatus used in the internal network may be simply implemented and power consumption may be reduced.

Figure 13:
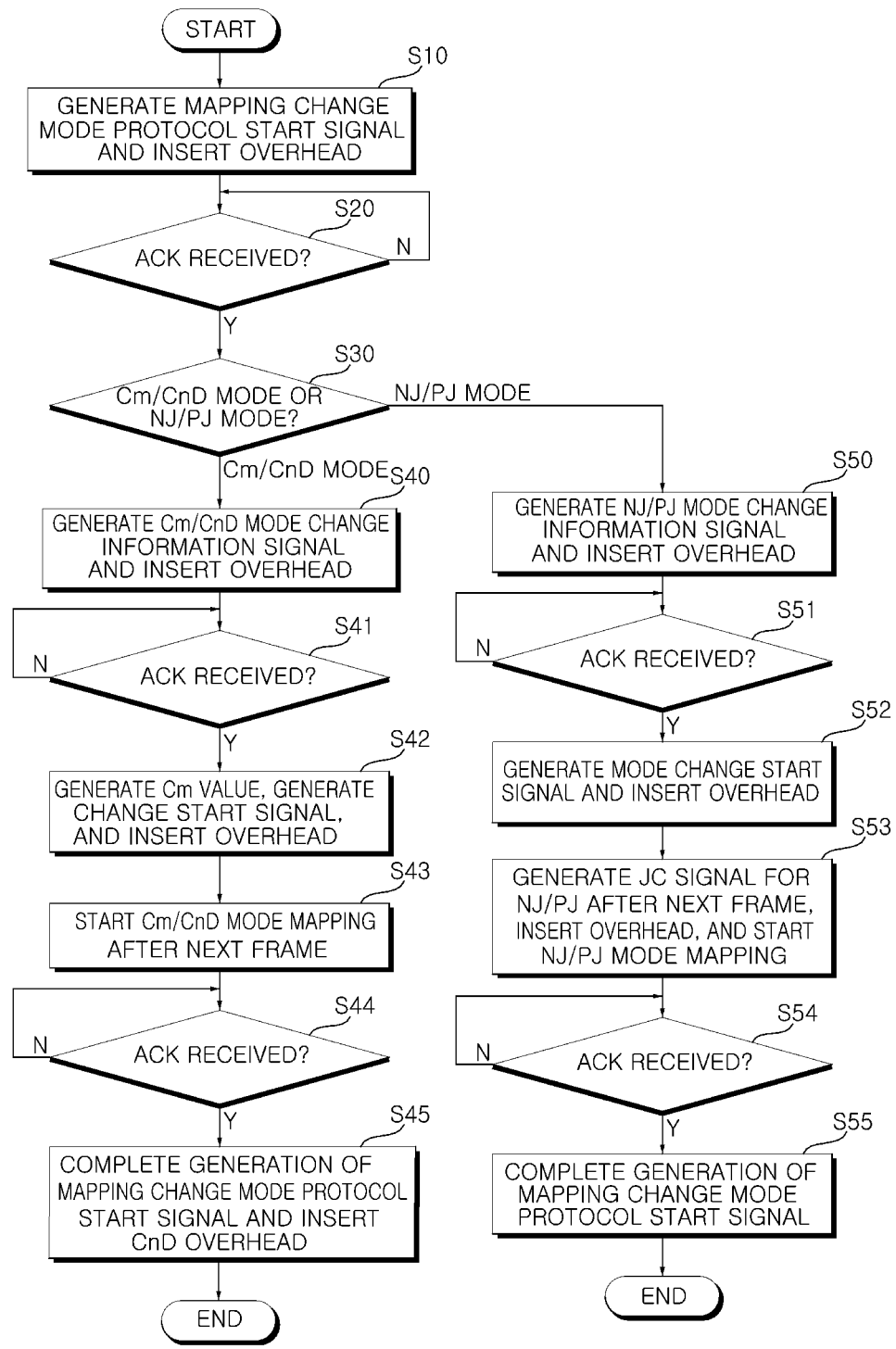
FIG. 13 is a flowchart illustrating a method for changing a mapping mode in a hitless manner while the mapping apparatus of FIG. 11 according to the embodiment of the present invention provides a service of directly transmitting a client signal.

FIG. 13 is a flowchart illustrating a method for changing a mapping mode in a hitless manner while the mapping apparatus of FIG. 11 according to the embodiment of the present invention provides a service of directly transmitting a client signal.

Two mapping modes may be mutually changed in an out-of-service state during a specific time. FIG. 13 illustrates a method for changing a mapping mode in an in-service state. A mapping changing mode protocol is started and a protocol start notifying signal is inserted into OTUk/ODUk/OPUk overheads (S10).

A receiver determines whether an ACK signal is received. When the ACK signal is not received for a specific period, the protocol notifying signal is removed and the protocol is terminated. When the ACK signal is received, a next procedure is performed (S20).

After receiving the ACK signal, it is determined whether to change to a Cm/CnD mapping mode or an NJ/PJ mapping mode (S30).

When changing to the Cm/CnD mapping mode, a Cm/CnD mode change information signal is inserted into OTUk/ODUk/OPUk overheads in order that a receiver of the other party confirms the support of the Cm/CnD mapping mode (S40).

It is determined whether the ACK signal for the mode change information signal is received. When the ACK signal is received, a next procedure is performed (S41). When the ACK signal is not received, a variety of processing methods may be performed. As one example, the process is reset to an initial state and the protocol is terminated.

After receiving the ACK signal, a Cm value is generated. A mode change start signal indicating that a mode change is started from a next frame is inserted into an overhead together with Cm value information. Therefore, the receiver of the other party is made to prepare to receive a mapping-mode changed signal (S42).

The mapping apparatus starts the Cm/CnD mode mapping from a frame after a point of time when the mode change start signal is inserted into the overhead (S43).

It is determined whether the ACK signal for the mode change start signal is received from the receiver. When the ACK signal is received, a next procedure is performed (S44). When the ACK signal is not received, a variety of processing methods may be performed. As one example, the process is reset to an initial state and the protocol is terminated.

After receiving the ACK signal, the mapping mode change protocol start notifying signal, the mapping mode change information signal, and the mapping mode change start signal are removed and the protocol is terminated (S45). A function of inserting a CnD value into the OPU3 overhead is provided as an option.

When changing to the NJ/PJ mapping mode, an NJ/PJ mode change information signal is inserted into OTUk/ODUk/OPUk overheads in order to confirm the support of the NJ/Pj mapping mode to the receiver of the other party (S50).

It is determined whether the ACK signal for the mode change information signal is received. When the receiver supports the mode change to the NJ/PJ mapping mode, the receiver will transmit the ACK signal. When the ACK signal is received, a next procedure is performed (S51). When the ACK signal is not received, a variety of processing methods may be performed. As one example, the process is reset to an initial state and the protocol is terminated.

After receiving the ACK signal, a mode change start signal indicating that a mode change is started from a next frame is inserted into an overhead. Therefore, the receiver of the other party is made to prepare to receive a signal in the NJ/PJ mapping mode (S52).

The mapping apparatus starts the NJ/PJ mode mapping from a frame after a point of time when the mode change start signal is inserted into the overhead, and JC overhead for NJ and PJ is inserted together (S53).

It is determined whether the ACK signal for the mode change start signal is received from the receiver. When the ACK signal is received, a next procedure is performed (S54). When the ACK signal is not received, a variety of processing methods may be performed. As one example, the process is reset to an initial state and the protocol is terminated.

After receiving the ACK signal, the mapping mode change protocol start notifying signal, the mapping mode change information signal, and the mapping mode change start signal are removed and the protocol is terminated (S55).

Figure 14:
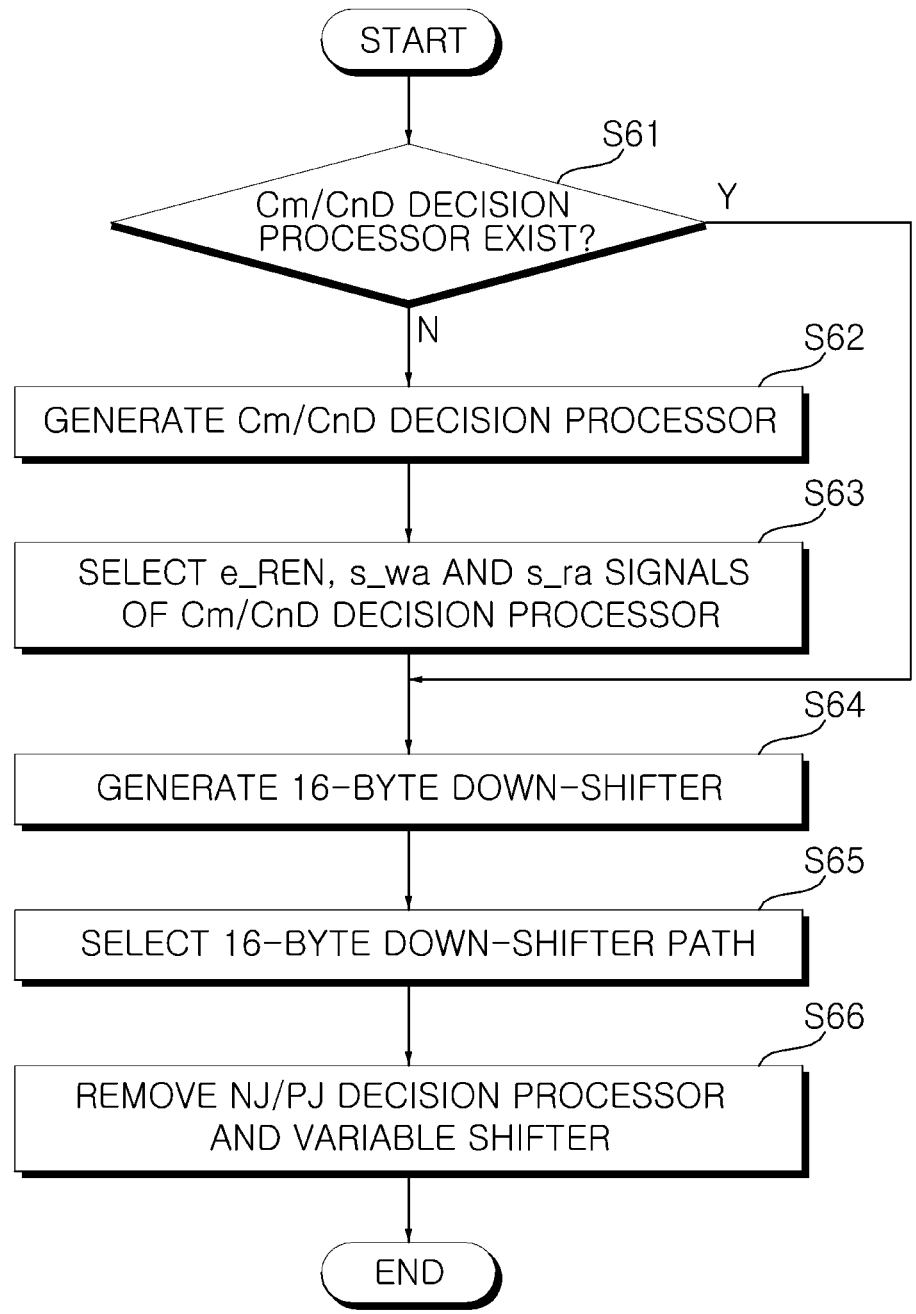
FIG. 14 is a flowchart illustrating a method for converting an NJ/PJ mapping apparatus into a Cm/CnD mapping apparatus according to the first embodiment of the present invention.

FIG. 14 is a flowchart illustrating a method for converting an NJ/PJ mapping apparatus into a Cm/CnD mapping apparatus according to the first embodiment of the present invention. If the mapping apparatus is used only in the internal network or if the signal generated by mapping the STM-256 signal to OPU3 in the NJ/PJ mapping scheme as illustrated in FIG. 1 is not received in the external network, the mapping apparatus need not support the NJ/PJ mapping mode. That is, the mode change is performed such that the mapping apparatus operates in the Cm/CnD mapping mode, and hardware is partially modified to optimally reduce logic capacity, thereby minimizing power consumption. In the case of ASIC, power consumption may be reduced by inputting no clocks to unused logic blocks. In the case of Field Programmable Gate Array (FPGA), the mapping apparatus may be completely converted through partial programming.

By partial programming of the entire mapping apparatus, an error in the client signal transmission may be tolerated for a while.

FIG. 14 illustrates a method for converting a mapping apparatus during an in-service of transmitting possible client signals.

First, it is determined whether the Cm/CnD decision processor exists within logic (S61).

When the Cm/CnD decision processor does not exist, the Cm/CnD decision processor is generated or driven (S62). In the case of FPGA, logic is added through partial programming, and in the case of ASIC, a clock is input to a corresponding block (S63).

When the Cm/CnD decision processor exists or after the Cm/CnD decision processor is generated, e_REN, s_wa and s_ra signals generated by not the NJ/PJ decision processor but the Cm/CnD decision processor are selected such that the variable shifter is controlled by the Cm/CnD decision processor within the mapping apparatus (S63).

Thereafter, the 16-byte down-shifter is generated or driven in order to reduce logic capacity or power consumption (S64).

A data path through the 16-byte down-shifter, not a data path through the variable shifter, is selected (S65).

The other unnecessary parts, for example, the NJ/PJ decision processor and the variable shifter, are removed or stopped (S66). In the case of FPGA, the corresponding unnecessary logic is removed through partial programming. In the case of ASIC, a clock input to the corresponding unnecessary block is removed.

Figure 15:
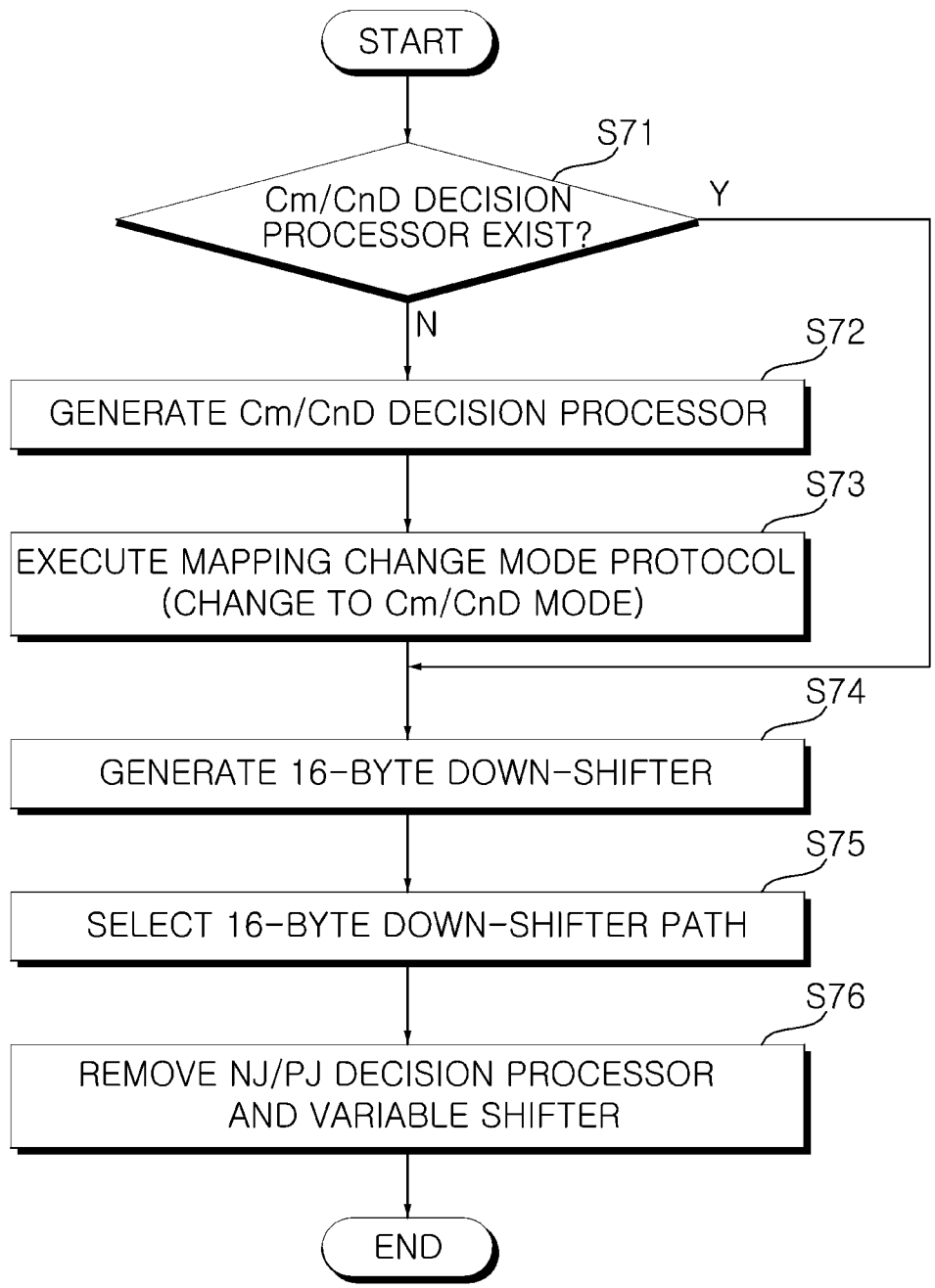
FIG. 15 is a flowchart illustrating a method for converting an NJ/PJ mapping apparatus into a Cm/CnD mapping apparatus according to the second embodiment of the present invention.

FIG. 15 is a flowchart illustrating a method for converting an NJ/PJ mapping apparatus into a Cm/CnD mapping apparatus according to the second embodiment of the present invention. In FIG. 15, a mapping mode is changed in a transmitter on the assumption that a receiver of the other party can well receive signals in the Cm/CnD mapping mode.

FIG. 15 is a flowchart illustrating a method for converting to a Cm/CnD mapping apparatus in a hitless manner according to a state of the receiver of the other party by using the mapping change mode protocol described above with reference to FIG. 13.

The method of FIG. 15 is not greatly different from the method of FIG. 14. When the Cm/CnD decision processor exists or after the Cm/CnD decision processor is generated, a mapping change mode protocol is executed (S73).

The mapping change mode protocol notifies the transmitter of whether the receiver of the other party can receive the signal in the Cm/CnD mapping mode. When the reception is possible in the Cm/CnD mapping mode, the mapping apparatus is driven in a hitless manner by the Cm/CnD decision processor.

When the mapping change mode protocol is completed, the 16-byte down-shifter is generated or driven (S74). The subsequent procedures S75 and S76 and the steps S71 and S72 are substantially identical to those of FIG. 14.

The apparatus and method for mapping the STM-256 signal and the 40-Gbps client signal to the OPU3 payload have been described above.

Figure 16:
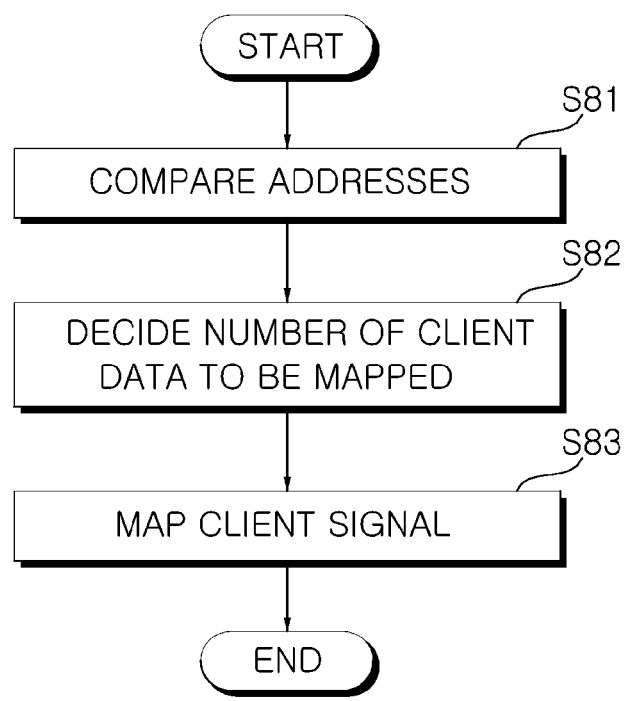
FIG. 16 is a flowchart illustrating a client signal mapping method according to an exemplary embodiment of the present invention.

Next, a client signal mapping method of a client signal mapping apparatus will be described. FIG. 16 is a flowchart illustrating a client signal mapping method according to an exemplary embodiment of the present invention. The client signal mapping method will be described below with reference to FIG. 16.

First, it is determined whether a difference value between a first address for client data to be stored in a buffer and a second address for client data to be read from the buffer exceeds an acceptable limit value of the buffer (address comparing step S81).

After the address comparing step S81, the number of client data to be mapped is decided according to a determination result value (data number deciding step S82). In addition to the determination result value, an OTU frame start notifying signal and a client clock may be further used when the number of client data to be mapped is decided in the data number deciding step S82.

After the data number deciding step S82, the client signal is mapped by changing a position of the client data in the client signal, based on the decided number of client data (client signal mapping step S83).

When the client signal mapping is performed with minimum logic, the client signal mapping step S83 may include a down-shift step and a first encoding step. In the down-shift step, the client data located at a predefined position in the client signal is down-shifted. In the first encoding step, the number of client data is received at every OTU frame period, the down-shifted client data is encoded based on the received number of client data, and the client signal containing the down-shifted client data is mapped.

The down-shift step may include a m-clock data delaying step, a data path selecting step, and a data storing step. In the m-clock data delaying step, a client data in the client signal is delayed for m number of clocks so as to down-shift the client data located at the Most Significant Bit (MSB) in the client signal. In the data path selecting step, down-shifted client data and non-down-shifted client data in the client signal are separated, and a data path of the client data is selected. In the data storing step, the client data is stored separately according to the selected data path.

When the mapping apparatus is synchronous with a client terminal, the client signal mapping step S83 may include a variable shift step and a second encoding step. In the variable shift step, the client data is divided in the client signal on a byte basis and is up-shifted or down-shifted. In the variable shift step, the up-shift or the down-shift is performed according to an increase or decrease of the first address or the second address. In the second encoding step, the decided number of client data is received at every OTU frame period, up-shifted first client data or down-shifted second client data is encoded based on the received number of client data, and the client signal containing the first client data or the second client data is mapped.

The variable shift step may include a data splitting step, a data aligning step, and a data combining step. In the data splitting step, the respective byte-based client data is split into bit-based client data. In the data aligning step, the bit-based client data located at common positions at each byte-based client data are received, the received bit-based client data are aligned on a basis of the byte-based client data, and the bit-based client data located at a selected common position is up-shifted or down-shifted. In the data combining step, up-shifted or down-shifted byte-based client data are generated by combining the aligned bit-based client data.

When the mapping apparatus is asynchronous with a client terminal, the client signal mapping step S83 may further include a byte usage determining step and a signal control step as well as the variable shift step and the second encoding step. The byte usage determining step and the signal control step may be performed before the variable shift step. In the byte usage determining step, a usage of a first byte or a second byte to be used in the mapping when asynchronous with the client terminal is determined, depending on a determination result value. In the signal control step, at least one value among the number of client data to be mapped, the increase or decrease of the first address, and the increase or decrease of the second address, is controlled depending on the determined usage of the first byte or the determined usage of the second byte.

Meanwhile, a mode changing step may be performed before the variable shift step. The mode changing step is a step of changing a mode related to the mapping, depending on whether it is synchronous with the client terminal while the client signal is being input from the client terminal. The mode changing step may include a driving control step, a module generating step, and a module control step. In the driving control step, the variable shifter performing the variable shift step is controlled to drive the data number decider performing the data number deciding step. In the module generating step, a down-shift module down-shifting client data located at a predefined position in the client signal is generated. In the module control step, the generated down-shift module is controlled to separate down-shifted client data and non-down-shifted client data and select a data path of the client data.

The mode changing step may further a determining step, a generating step, and a driving stop control step. The determining step and the generating step may be performed before the driving control step. In the determining step, it is determined whether the data number decider is provided. In the generating step, the data number decider is newly generated when the data number decider is not provided. The driving stop control step may be performed after the module control step. In the driving stop control step, the driving of the variable shifter and the byte usage determiner performing the byte usage determining step is stopped.

Meanwhile, the client signal mapping step S83 may further include a synchronization determining step. The synchronization determining step is a step of determining whether the synchronization with the client terminal is possible. The synchronization determining step may be performed before the byte usage determining step.

Meanwhile, the client signal mapping method may further include a first address generating step, a buffer executing step, and a second address generating step. The first address generating step, the buffer executing step, and the second address generating step may be performed before the address comparing step S81. In the first address generating step, a first address with respect to input first client data is generated. In the buffer executing step, the first client data is stored based on the generated first address, and the first client data or prestored second client data is read upon mapping. In the second address generating step, a second address with respect to the read second client data is generated.

The present invention relates to an apparatus and a method for mapping a client signal in an Optical Transport Network (OTN) system and is applicable to the fields of Ethernet or the fields of optical transport technology (TDM, WDM).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A client signal mapping apparatus comprising:
   an address comparator configured to determine whether a difference value between a first address for client data to be stored in a buffer and a second address for client data to be read from the buffer exceeds an acceptable limit value of the buffer;
   a data number decider configured to decide the number of client data to be mapped, depending on a determination result value of the address comparator;
   a client signal mapper configured to map the client signal by changing a position of the determined client data in a client signal based on the decided number of client data; and
   a variable shifter configured to divide the client data in the client signal on a byte basis and up-shift or down-shift the client data according to an increase or decrease of the first address or the second address.

2. The client signal mapping apparatus of claim 1, wherein, when synchronous with a client terminal, the client signal mapper comprises an encoder configured to receive the decided number of client data at an Optical channel Transport Unit (OTU) frame period, encode up-shifted first client data or down-shifted second client data based on the received number of client data, and map the client signal containing the first client data or the second client data.

3. The client signal mapping apparatus of claim 2, wherein the variable shifter comprises:
- a data splitter configured to split respective byte-based client data into bit-based client data;
- a data aligner configured to receive the bit-based client data located at common positions at each byte-based client data, align the received bit-based client data on a basis of the byte-based client data, and up-shift or down-shift the bit-based client data located at a selected common position; and
- a data combiner configured to generate up-shifted or down-shifted byte-based client data by combining the aligned bit-based client data.

4. The client signal mapping apparatus of claim 3, wherein the data aligner is provided as many as the number of byte-based client data to be used in the mapping.

5. The client signal mapping apparatus of claim 2, wherein, when asynchronous with the client terminal, the client signal mapper further comprises:
- a byte usage determiner configured to determine a usage of a first byte or a second byte to be used in the mapping when asynchronous with the client terminal, depending on the determination result value; and
- a signal controller configured to control at least one value among the number of client data to be mapped, the increase or decrease of the first address, and the increase or decrease of the second address, depending on the determined usage of the first byte or the determined usage of the second byte.

6. The client signal mapping apparatus of claim 5, wherein the variable shifter up-shifts or down-shifts the client data according to the control of the signal controller.

7. The client signal mapping apparatus of claim 5, further comprising:
- a mode changer configured to change a mode related to the mapping, depending on whether the client signal mapper is synchronous with the client terminal while the client signal is being input from the client terminal, wherein the mode changer comprises:
  - a driving controller configured to control the variable shifter to drive the data number decider;
  - a module generator configured to generate a down-shift module for down-shifting client data located at a predefined position in the client signal; and
  - a module controller configured to control the generated down-shift module to separate down-shifted client data and non-down-shifted client data and select a data path of the client data.

8. The client signal mapping apparatus of claim 7, wherein the mode changer further comprises:
- a determiner configured to determine whether the data number decider is provided;
- a generator configured to newly generate the data number decider when the data number decider is not provided; and
- a driving stop controller configured to stop driving the variable shifter and the byte usage determiner.

9. The client signal mapping apparatus of claim 7, wherein the client signal mapper further comprises a mode change information inserter configured to insert mode change information into an overhead to notify that a mode is changed by the mode changer.

10. The client signal mapping apparatus of claim 5, wherein the client signal mapper further comprises a synchronization determiner configured to determine whether synchronization with the client terminal is possible.

11. A client signal mapping method comprising:
- determining whether a difference value between a first address for client data to be stored in a buffer and a second address for client data to be read from the buffer exceeds an acceptable limit value of the buffer, yielding a determination result value;
- deciding the number of client data to be mapped, depending on the determination result value;
- mapping the client signal by changing a position of the determined client data in a client signal based on the decided number of client data; and
- dividing the client data in the client signal on a byte basis and up-shifting or down-shifting the client data according to an increase or decrease of the first address or the second address.

12. The client signal mapping method of claim 11, wherein, when a client signal mapper is synchronous with a client terminal, the mapping comprises:
- receiving the decided number of client data at an Optical channel Transport Unit (OTU) frame period, encoding up-shifted first client data or down-shifted second client data based on the received number of client data, and mapping the client signal containing the first client data or the second client data.

13. The client signal mapping method of claim 11, wherein, when asynchronous with the client terminal, the mapping step further comprises:
- determining a usage of a first byte or a second byte to be used in the mapping when asynchronous with the client terminal, depending on the determination result value; and
- controlling at least one value among the number of client data to be mapped, the increase or decrease of the first address, and the increase or decrease of the second address, depending on the determined usage of the first byte or the determined usage of the second byte.

14. The client signal mapping method of claim 13, further comprising:
- changing a mode related to the mapping, depending on whether to be synchronous with the client terminal while the client signal is being input from the client terminal, comprising:
  - generating a down-shift module for down-shifting client data located at a predefined position in the client signal; and
  - controlling the generated down-shift module to separate down-shifted client data and non-down-shifted client data and select a data path of the client data.

15. The client signal mapping method of claim 13, wherein the mapping further comprises determining whether synchronization with the client terminal is possible.

16. A client signal mapping apparatus comprising:
- an address comparator configured to determine whether a difference value between a first address for client data to be stored in a buffer and a second address for client data to be read from the buffer exceeds an acceptable limit value of the buffer;
- a data number decider configured to decide the number of client data to be mapped, depending on a determination result value of the address comparator;
- a client signal mapper configured to map the client signal by changing a position of the determined client data in a client signal based on the decided number of client data; and a down-shifter configured to down-shift client data located at a predefined position in the client signal by decreasing a shifter write address signal and a shifter read address signal at a clock signal.

17. The client signal mapping apparatus of claim 16, wherein the client signal mapper comprises an encoder configured to receive the decided number of client data at an Optical channel Transport Unit (OTU) frame period, encode the received number of client data, and map the encoded received number of client data and the client signal containing the down-shifted client data.

18. The client signal mapping apparatus of claim 17, wherein the down-shifter comprises:
   an m-clock data delayer configured to delay a client data in the client signal for m number of clocks to down-shift the client data located at the Most Significant Bit (MSB) in the client signal;
   a data path selector configured to separate down-shifted client data and non-down-shifted client data in the client signal and select a data path of the client data; and
   a data storage configured to store the client data separately according to the selected data path.

19. A client signal mapping method comprising:
   determining whether a difference value between a first address for client data to be stored in a buffer and a second address for client data to be read from the buffer exceeds an acceptable limit value of the buffer, yielding a determination result value;
   deciding the number of client data to be mapped, depending on the determination result value;
   mapping the client signal by changing a position of the determined client data in a client signal based on the decided number of client data; and
   down-shifting client data located at a predefined position in the client signal by decreasing a shifter write address signal and a shifter read address signal at a clock signal.

20. The client signal mapping method of claim 19, wherein the mapping comprises receiving the decided number of client data at an Optical channel Transport Unit (OTU) frame period, encoding the down-shifted client data based on the received number of client data, and mapping the client signal containing the down-shifted client data.

* * * * *